United States Patent
Ikeuchi et al.

(10) Patent No.: US 6,851,022 B2
(45) Date of Patent: Feb. 1, 2005

(54) RAID CONTROLLER AND CONTROL METHOD THEREOF

(75) Inventors: Kazuhiko Ikeuchi, Kawasaki (JP); Mikio Ito, Kawasaki (JP); Hidejiro Daikokuya, Kawasaki (JP); Satomi Mamiya, Kawasaki (JP); Yoshio Kitamura, Kawasaki (JP); Minoru Muramatsu, Kawasaki (JP); Hiroyuki Hoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 202 days.

(21) Appl. No.: 09/994,698

(22) Filed: Nov. 28, 2001

(65) Prior Publication Data
US 2003/0018851 A1 Jan. 23, 2003

(30) Foreign Application Priority Data
Jul. 19, 2001 (JP) ........................................ 2001-220179

(51) Int. Cl.[7] .............................................. G06F 12/00
(52) U.S. Cl. ........................ 711/114; 711/162; 711/170
(58) Field of Search ................................ 711/114, 203, 711/221

(56) References Cited

U.S. PATENT DOCUMENTS

| | | | |
|---|---|---|---|
| 5,802,028 A | 9/1998 | Igarashi | 369/53.24 |
| 6,681,291 B2 | 1/2004 | Ikeuchi et al. | 711/114 |

FOREIGN PATENT DOCUMENTS

JP 11-143646 5/1999

Primary Examiner—Donald Sparks
Assistant Examiner—Brian R. Peugh
(74) Attorney, Agent, or Firm—Staas & Halsey LLP

(57) ABSTRACT

A RAID controller accesses an access request area on logical volumes distributed and stored on a plurality of physical disks according to a disk access request from a host. The controller has a plurality of management modules which are in-charge of plurality of the redundant groups respectively and issuing a logical format request for each area of said logical volume by referring to a management table for managing progress information of the logical format processing. Each management module has a plurality of the management table for being in-charge of said plurality of redundant groups and a queue for queuing the disk access request. The management module, according to the disk access request, judges whether all the access request areas have been logically formatted referring to the management table.

12 Claims, 22 Drawing Sheets

FIG. 4
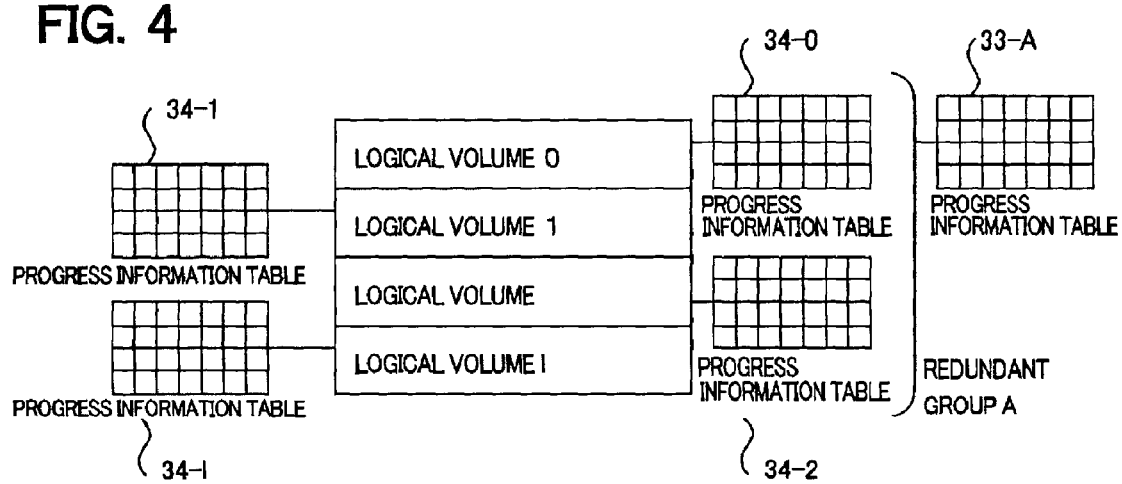
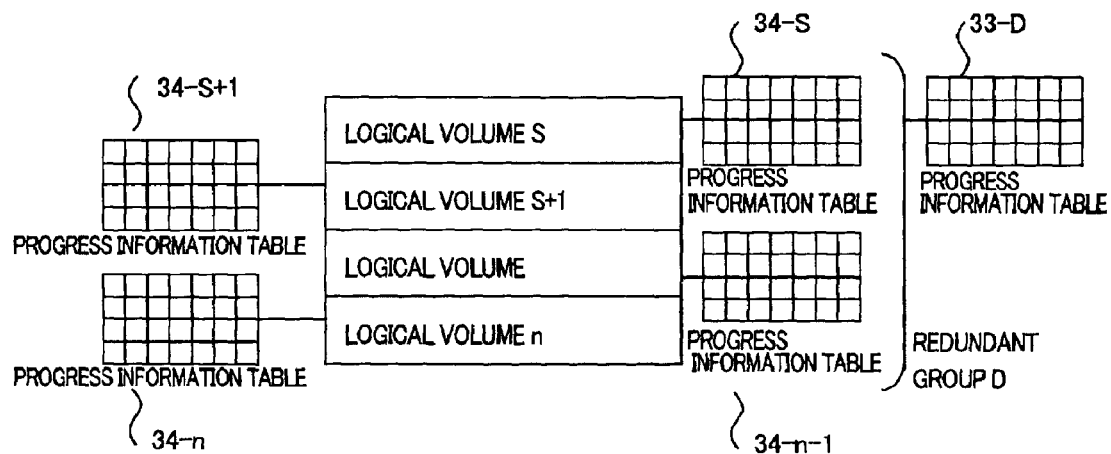

FIG. 21
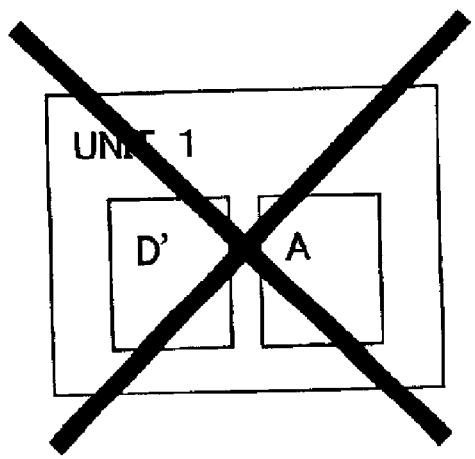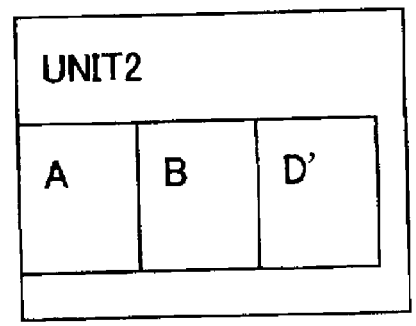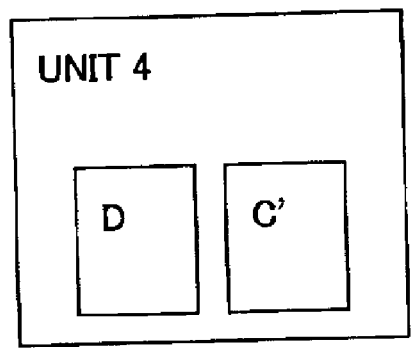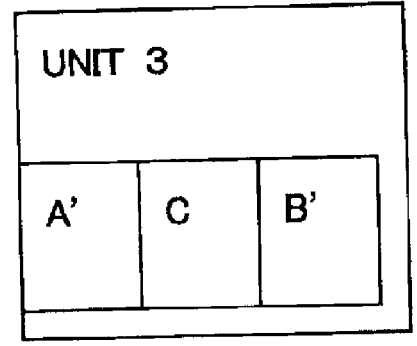

FIG. 23

| REDUNDANCY GROUP | UNIT | | | |
|---|---|---|---|---|
| | 1 | 2 | 3 | 4 |
| A | No | Active | Spare | No |
| B | No | Active | Spare | No |
| C | No | No | Active | Spare |
| D | No | Spare | No | Active |

RAID CONTROLLER AND CONTROL METHOD THEREOF

BACKGROUND OF THE INVENTION

1. Field of the Invention

The present invention relates to a storage controller for managing data using such a physical disk as a magnetic disk and method thereof, and more particularly to a RAID controller for managing data with redundancy, and control method thereof.

2. Description of the Related Art

For a storage equipment using such a storage medium as a magnetic disk, magneto-optical disk and optical disk, the format must be written to the storage medium to access the storage medium when requested by the data processing unit. There are two types of formats: a physical format such as the CKD format, and a logical format where a data area is separated in the processing unit of the host OS (e.g. in block units), and is identified.

By such formatting of the storage medium, the storage medium can be accessed (read/written) based on the host commands of the host OS. The physical format is the initialization processing of the medium in track units, and logical formatting is the format processing of the data area of the tracks, where physical formatting has been performed, in block units. Format processing takes time to format all the blocks of the medium, and in actual use of an unformatted medium, a long wait time (e.g. 30 minutes or more) for format processing is required.

To solve this problem, in a prior art, the storage medium is available immediately without performing format processing as the initialization processing, and performing format processing on the target block when a write access request is received, and then write operation is executed on the target block(e.g. Japanese Patent Laid-Open No. H8-147110).

In prior art, the logical formatting is executed when an access request is received, so logical formatting is not executed when the access request is not received. This prior art is suitable when such data as music and images are continuously written to one medium, such as an MD (Mini Disk).

However, when data is accessed randomly, such as the case of a large scale storage system connected to a host and server, both logical format processing and access processing must be executed for each access, so the time required for access processing increases, and access time becomes long.

Particularly in a RAID storage system which manages data with redundancy, the time required for logical format is several tens of minutes to several hours, depending on the size of the logical volume, so the access time increases in order to construct a new storage system and to add a logical volume to a current system.

Also for a RAID system, logical formatting considering the redundancy of data is necessary.

SUMMARY OF THE INVENTION

With the foregoing in view, it is an object of the present invention to provide a RAID controller for executing data processing, including host access, while executing logical format with maintaining redundancy, and the control method thereof.

It is another object of the present invention to provide a RAID controller for rebuilding multiplexed units to the redundant configuration at execution of the logical format during rebuild, even if one of the multiplexed units fails during logical format, and the control method thereof.

It is still another object of the present invention to provide a RAID controller for decreasing a delay in host access processing by executing logical format processing accompanied by host access and logical format processing unrelated to host access in parallel while maintaining the redundant configuration, and the control method thereof.

To achieve these objects, the present invention is a RAID controller which accesses an access request area on logical volumes distributed and stored on a plurality of physical disks according to a disk access request from a host device, comprising: a plurality of physical disk groups which are in-charge of different logical volumes respectively, where one logical volume is distributed to a plurality of physical disks to form redundant groups; a plurality of logical format management modules which issue a logical format request for each area of the logical volume referring to a management table for managing progress information of the logical format processing of the logical volume; and a plurality of lower layer modules which access the physical disk according to the processing request of the logical format management module. Each logical format management module has a management table of each physical disk group to be in-charge of the plurality of physical disks, and judges whether all the access areas have been logically formatted referring to the management table according to the disk access request. When judged as formatted, the module requests the disk access to the lower layer module, and when not formatted, the module issues a logical format processing request and queues the disk access request in a queue, and if there is no disk access request in the queue, the module searches an unformatted area from the management table and issues the logical format processing request.

According to the present invention, the logical format processing of a physical disk is performed in the background of host access, so host access can be executed while executing logical format sequentially.

Also the progress information on whether each block on the logical volume has been formatted or not is managed by a table, so a disk access request can be executed while executing sequential format processing, and whether the access area targeted by the disk access request has been formatted or not can be easily judged, therefore the response speed to an access request can be increased even if quick format is executed.

When redundant groups are constructed, quick format processing can be made redundant since the progress information of quick format is managed with redundancy, and when one unit fails, another unit can continue the quick format processing using the progress information thus far.

Also according to the present invention, it is preferable that when one logical format management module has an abnormality, another logical format management module executes the logical format of the physical disk group which this logical format management module is in-charge of, so that quick format processing can be easily continued by another unit using the progress information thus far when one unit fails.

Also according to the present invention, it is preferable that a RAID management module is further comprised so that when one logical format management module has an abnormality, a management table of the physical disk group which this logical format management module is in-charge of is restored in a logical format management module other than this logical format management module from the management table of another logical format management module. Therefore, the redundant configuration of quick format can be constructed by another unit, even if one unit fails.

Also according to the present invention, it is preferable that the RAID management module can easily restore the redundant configuration by executing the above mentioned restoration referring to a configuration table where the RAID configuration is described.

Also according to the present invention, it is preferable that the management table allows managing and updating the progress status of the logical format of a plurality of redundant groups easily by one unit, by managing the progress status in logical format processing units of a logical volume using bit maps.

BRIEF DESCRIPTION OF THE DRAWINGS

FIG. 4 is a diagram depicting the configuration of the management tables and bit maps in FIG. 2;

FIG. 21 is a diagram depicting a rebuild redundant configuration of a quick format progress management table in a redundant group when a unit fails according to an embodiment of the present invention;

FIG. 23 is a processing flow chart for a rebuild redundant configuration of the quick format progress management table in the redundant group according to an embodiment of the present invention in FIG. 21.

DESCRIPTION OF THE PREFERRED EMBODIMENTS

Embodiments of the present invention will now be described in the sequence of a RAID storage system, quick format processing, redundant configuration of quick format processing and other embodiments.

[RAID Storage System]

Figure 1:
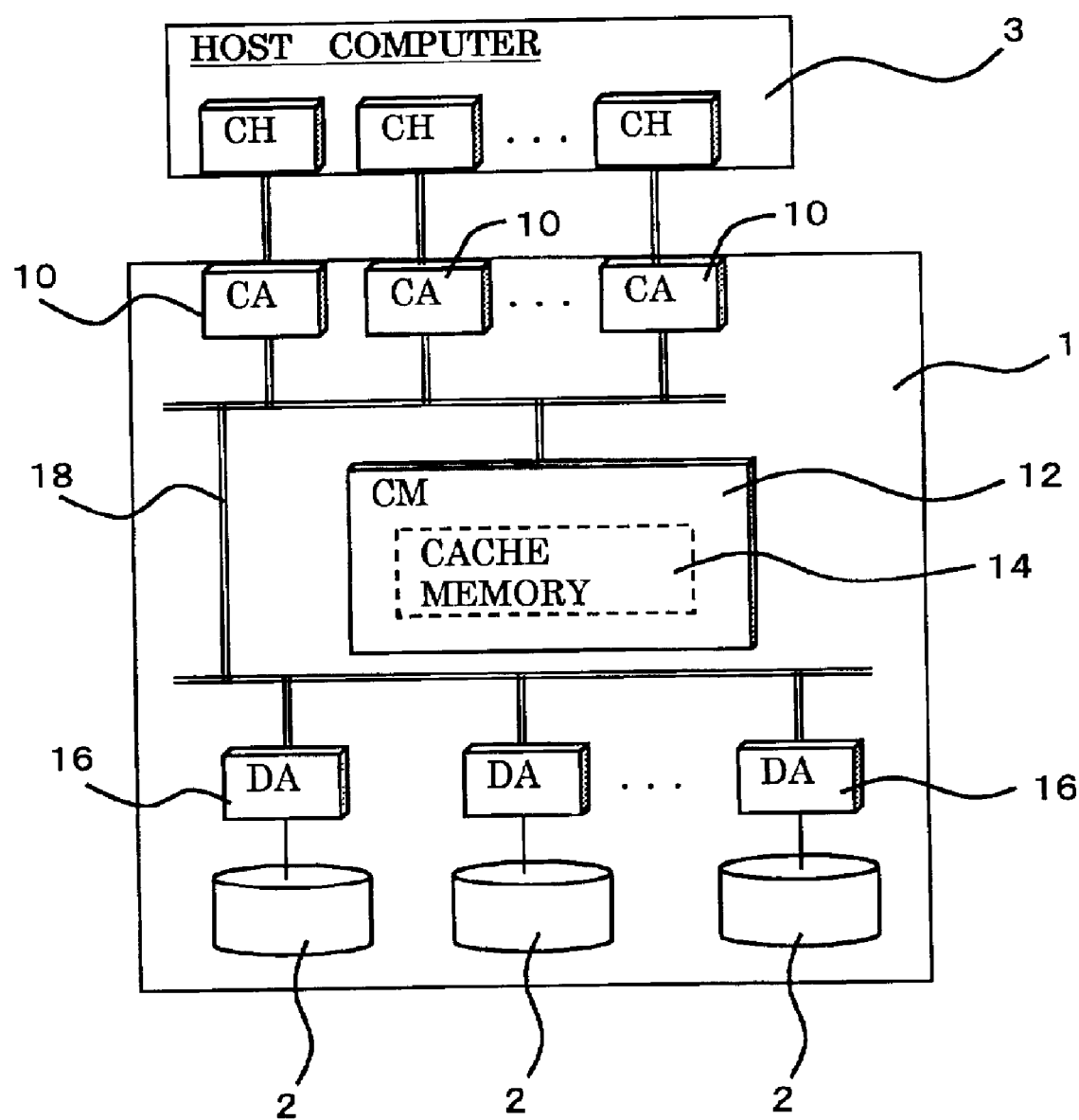
FIG. 1 is a diagram depicting a configuration of a storage system according to an embodiment of the present invention.

FIG. 1 is a diagram depicting a configuration of a storage system according to an embodiment of the present invention, and shows a RAID (Redundant Arrays of Inexpensive Disk) system using a magnetic disk as one embodiment. As FIG. 1 shows, a magnetic disk control unit (hereafter FCU(File Controll Unit)) 1 is a system which can read and write a large volume of data of the computer center (host) 3 to a RAID disk drive (hereafter called "disk") 2 at high-speed and at random.

FCU 1 is comprised of three functions: CA (Channel Adapter) 10, CM (Centralized Module) 12, and DA (Device Adapter) 16. These three function modules have respective roles to perform each action inside FCU 1, preventing the concentration of processing to one module. For the communication interface between modules, the processing content and the status of each module are transferred using messages and ACB.

An outline of each function module 10, 12 and 16 will now be presented. CA (Channel Adapter) 10 is a module device for controlling the host interface, which connects FCU 1 and HOST 3. CA 10 is for connecting HOST 3, CM 12 and DA 16, and for exchanging commands and data. This RAID (Redundant Arrays of Inexpensive Disks) is a disk system which replaces an expensive disk for large machines with a plurality of small capacity and inexpensive disks for small computer machines, maintaining data and insuring redundancy.

Figure 2:
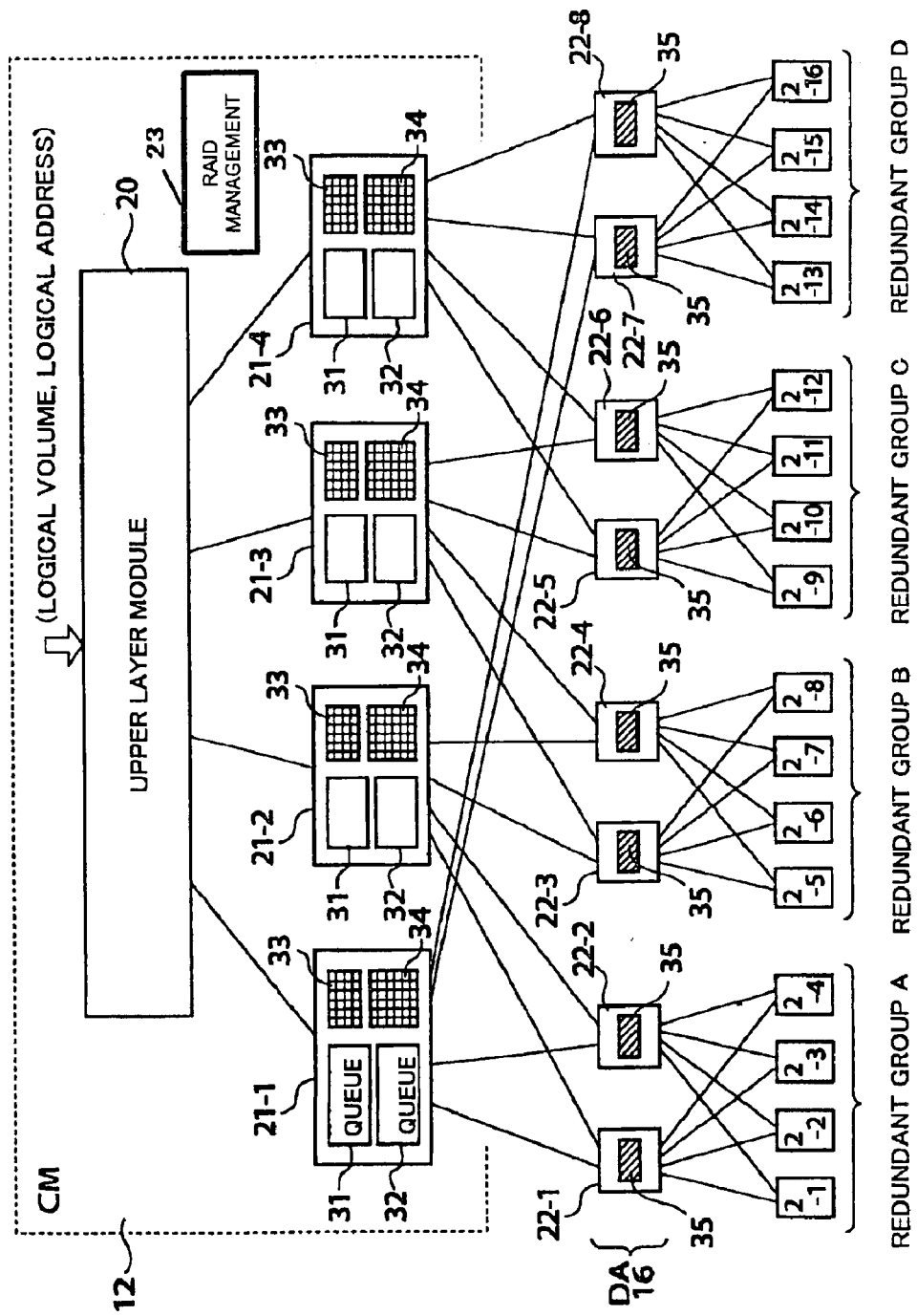
FIG. 2 is a diagram depicting a configuration of a storage system with a redundant configuration according to an embodiment of the present invention.

FIG. 2 is a block diagram depicting the details of the configuration in FIG. 1, and shows the modules used to implement quick format. Here quick formatting means allowing host access before executing actual logical format, executing the logical format processing in the background during host access. FIG. 2 shows the system of RAID 5, comprising four redundant groups, A, B, C and D, and each group is further comprised of four physical disks: 2-1 to 2-4, 2-5 to 2-8, 2-9 to 2-12 and 2-13 to 2-16.

CM 12 is comprised of the upper layer module 20 and four quick format modules 21-1 to 21-4, and the RAID management module 23. DA 16 has lower layer modules 22-1 to 22-8. The upper layer module 20 requests logical format and read/write. The lower layer modules (devices) 22-1 to 22-8 manage logical format, and such disk access as read and write.

The upper layer module 20 receives a request from the host 3 via the CA 10, judges whether I/O (Input/Output) to the physical disk is necessary, and if necessary, the upper layer module 20 requests a disk access request to the lower layer modules 22-1 to 22-8, and requests a write back, which is scheduled in the module, to the lower layer module. The RAID management module 23 manages the maintenance of the redundant configuration for each redundant group, as described later in FIG. 18 and subsequent drawings.

The quick format management modules 21-1 to 21-4 have functions to execute format processing sequentially for each block on the logical volume, regardless the host access, and to execute format processing for a block on the logical volume if necessary when a block is specified by a disk access request from the module 20 in the upper layer.

Here the four quick format management modules 21-1 to 21-4 are disposed for the four redundant groups A, B, C and D. Each management module 21-1 to 21-4 is in-charge of two redundant groups. For example, the management module 21-1 is in-charge of the redundant group A, and is also in-charge of the redundant group D when a failure occurs. The connection relationship between the modules in FIG. 2 is indicated by logical paths.

The lower layer modules 22-1 to 22-8 receive requests from the module 20 in the upper layer and quick format management modules 21-1 to 21-4 in the lower layer queue 35, and performs I/O (Input/Output) operations to the physical disks 2-1 to 2-16, including data redundancy management. Here a duple configuration is used, providing two lower layer modules 22-1 to 22-8 for each redundant group A, B, C and D.

Each quick format management module 21-1 to 21-4 is comprised of a format queue 31, a format request queue 32 for avoiding excessive requests, a progress information table 33 for format processing of each logical volume which constitutes a redundant group, and a progress information table 34 for logical format processing of each block of each logical volume.

Figure 3:
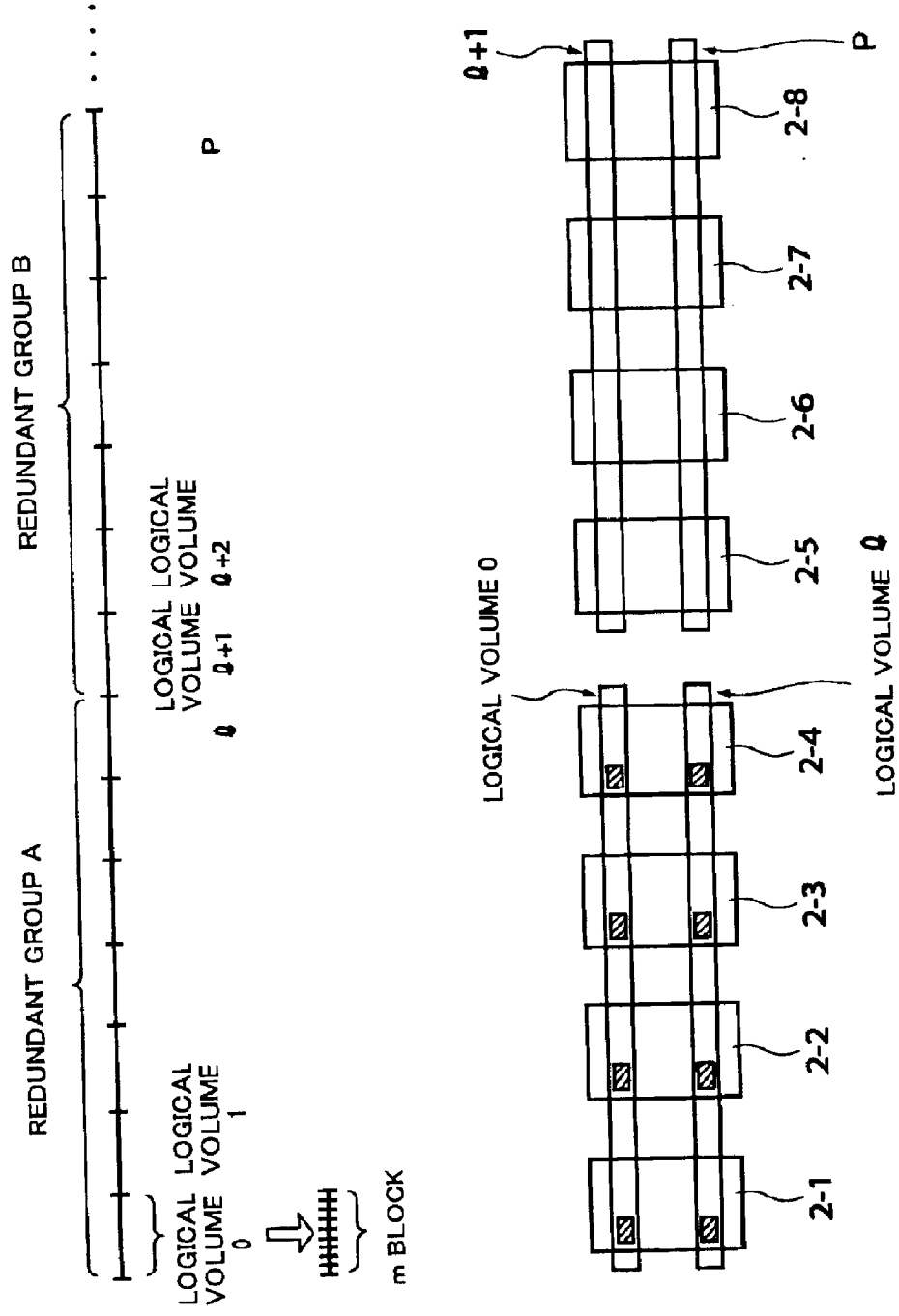
FIG. 3 is a diagram depicting the relationship between the redundant groups, logical volumes and physical disks in FIG. 2.

Now the relationship between the logical volumes and the physical disks will be described with reference to FIG. 3. When all the logical volumes are '0' to 'n', each redundant group A, B, C and D is in charge of a part of all the logical volumes '0' to 'n', for example, ¼ of logical volumes '0' to '1', '1'+'1' to 'P', . . . , and 's' to 'n' respectively, as shown in FIG. 3. For example, in the configuration of RAID 5, each redundant group has data on three of the four disks in the RAID configuration, as described in FIG. 16, and has check data on one disk, forming a redundant configuration. In the configuration of RAID 1, each redundant group has the redundant configuration of two disks, and each redundant group is in-charge of all the logical volumes '0' to 'n'.

A logical volume is a recognition unit of the OS of the host 3, and is comprised of 'm' blocks of data. In the RAID configuration, each block of a logical volume is distributed to a plurality (in this case 4 numbers) of physical disks 2-1 to 2-4. For example, blocks of each logical volume '0' to '1' of the redundant group A are distributed to four physical disks, 2-1 to 2-4, which are in charge of redundant group A. In other words, a plurality of physical disks are in-charge of one logical volume, that is, the so called "redundant configuration".

FIG. 4 is a diagram depicting the progress information tables 33 and 34 in FIG. 2. The quick format management modules 21-1 to 21-4 have information on whether each block in the quick format has been formatted or not. Here the information to distinguish unformatted/formatted areas is by bit maps 34-0 to 34-n provided for each logical volume '0' to 'n'.

Also logical volume management table 33-A for managing the progress of each redundant group in logical volume units is provided, where the quick format processing of each redundant group in logical volume units is managed. By this, format processing in logical volume units becomes possible. Since bit maps of each logical volumes are not searched for formatted logical volumes, a processing delay rarely occurs. In other words, for the redundant groups A, B, C and D, the management tables 33-A, 33-B, 33-C and 33-D of logical volumes and bit maps 34-0 to 34-1, 34-1+1 to 34-P, - - -, 34-s to 34-n are provided respectively.

Figure 5:
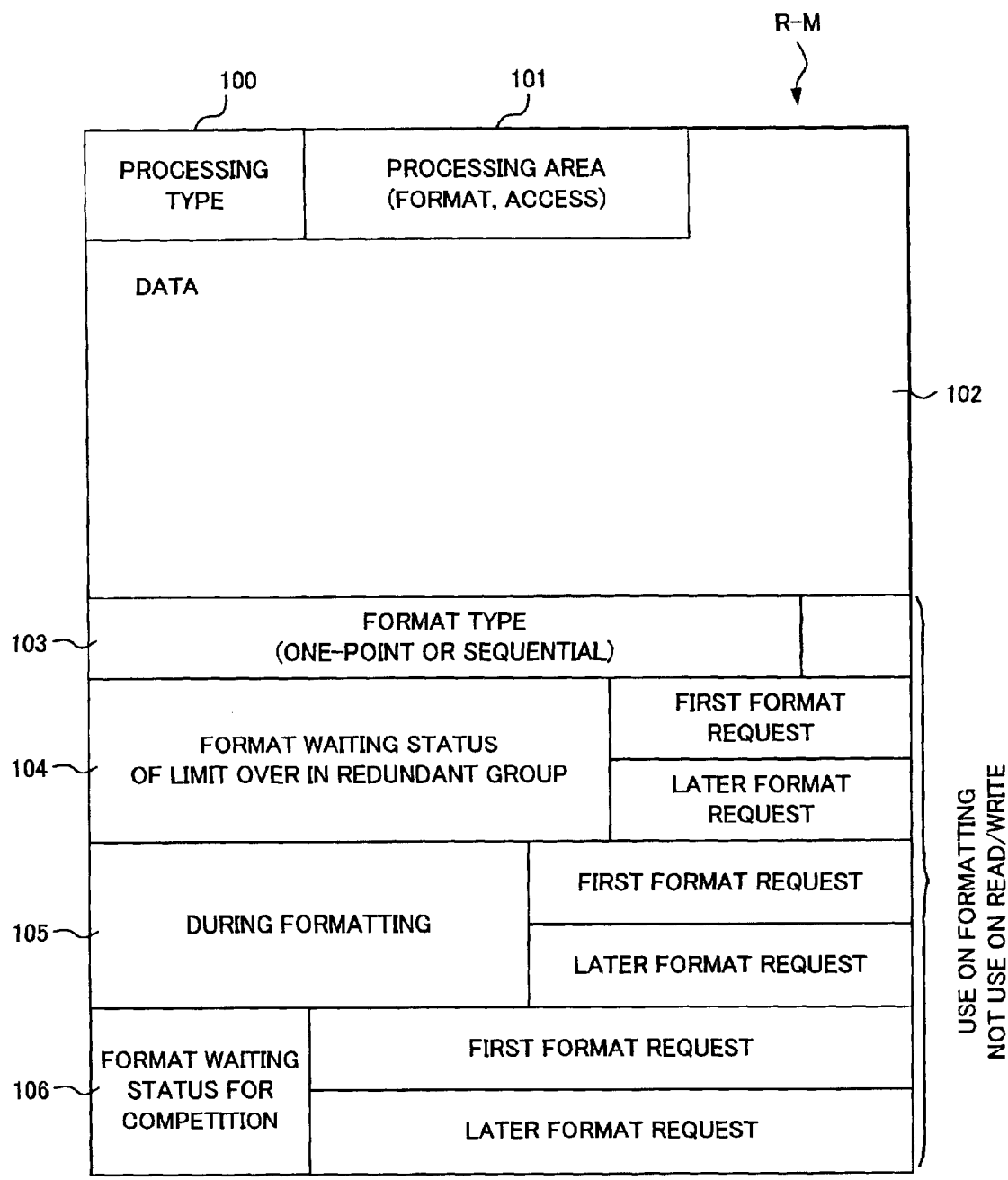
FIG. 5 is a diagram depicting the request content table attached to the processing request of the lower layer module in FIG. 2.

FIG. 5 is a diagram depicting the requested content table R-M attached to the request transmitted to the lower layer modules 22-1 to 22-8.

The table R-M is comprised of a request processing type, (read, write, format) 100, a processing area (format area, access area) 101, and a data area 102. Also information for formatting is set in an area which is not used during a read/write access.

In other words, the format type (one-point or sequential), and the format request accepted first and the format request accepted later 104 among format requests waiting for formatting when processing the upper limit is exceeded in a redundant group, the format request accepted first and the format request accepted later 105 among format requests during format execution, and the format request accepted first and the format request accepted later 106 among format requests in competition with format requests in format execution are set.

These tables R-M are created by the upper layer module 20 and the quick format management modules 21-1 to 21-4 when requested, and are added to a request.

[Quick Format Processing]

Figure 6:
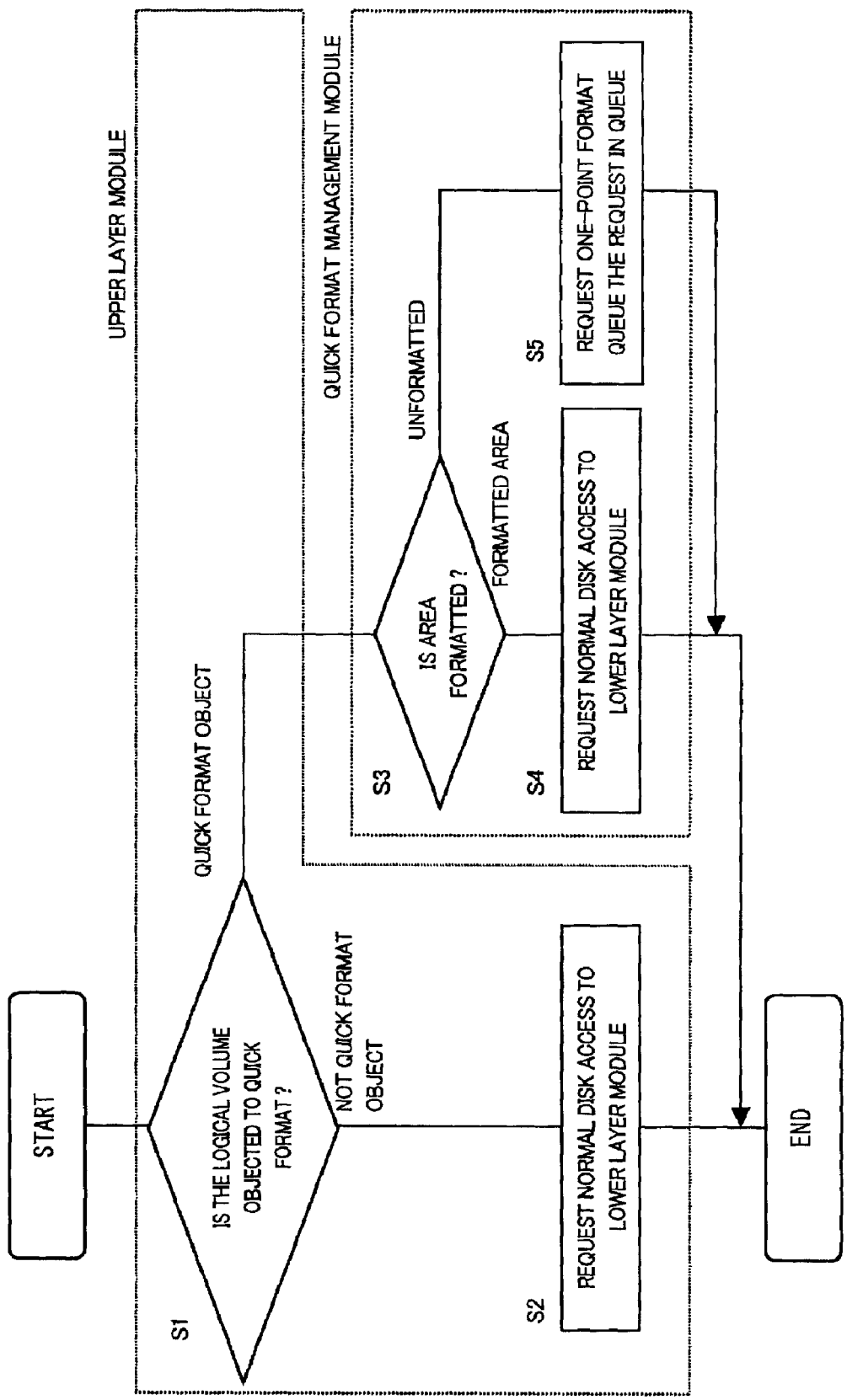
FIG. 6 is a flow chart depicting the request processing of the upper layer of the upper layer module and the quick format management module in FIG. 2.

The processing of the upper layer module 20 in FIG. 2 and the quick format management module 21 of FIG. 2 will now be described with reference to FIG. 6. These are processings of the management module 21 when the management module 21 in FIG. 2 receives a request from the module on the upper layer module.

(S1) The upper layer module 20 judges whether the access target of the host is a logical volume to be targeted under quick format. The access request includes the logical volume name and the logical address. In the logical volume management table 33, a flag to indicate whether quick format has been performed for each logical volume is stored. The upper layer module 20 refers to this management table 33, and judges whether the access target logical volume is the target under the quick format.

(S2) When the access target logical volume is not the target under quick format, the logical volume has been formatted, so a normal disk access is requested to the lower layer modules 22-1 to 22-8. The lower layer modules 22-1 to 22-8 queue this disk access to the lower layer queue 35, and access the disk in the sequence of the queue.

(S3) When a logical volume where quick format has been performed is accessed from the host, on the other hand, the processing is transferred to the quick format management modules 21-1 to 21-4. The quick format management module 21-1 to 21-4 judges whether the access area has been formatted using the bit maps 34-0 to 34-n of the corresponding logical module.

(S4) When the access target area has been formatted, a normal disk access is requested to the lower layer modules 22-1 to 22-8. The lower layer modules 22-1 to 22-8 queue this disk access to the lower layer queue 35, and access the disk in the sequence of the queue.

(S5) When an unformatted area exists in the access request area, a format request (called a "one-point format request) for the area is issued, and this access is queued in the format-waiting queue 31.

Figure 7:
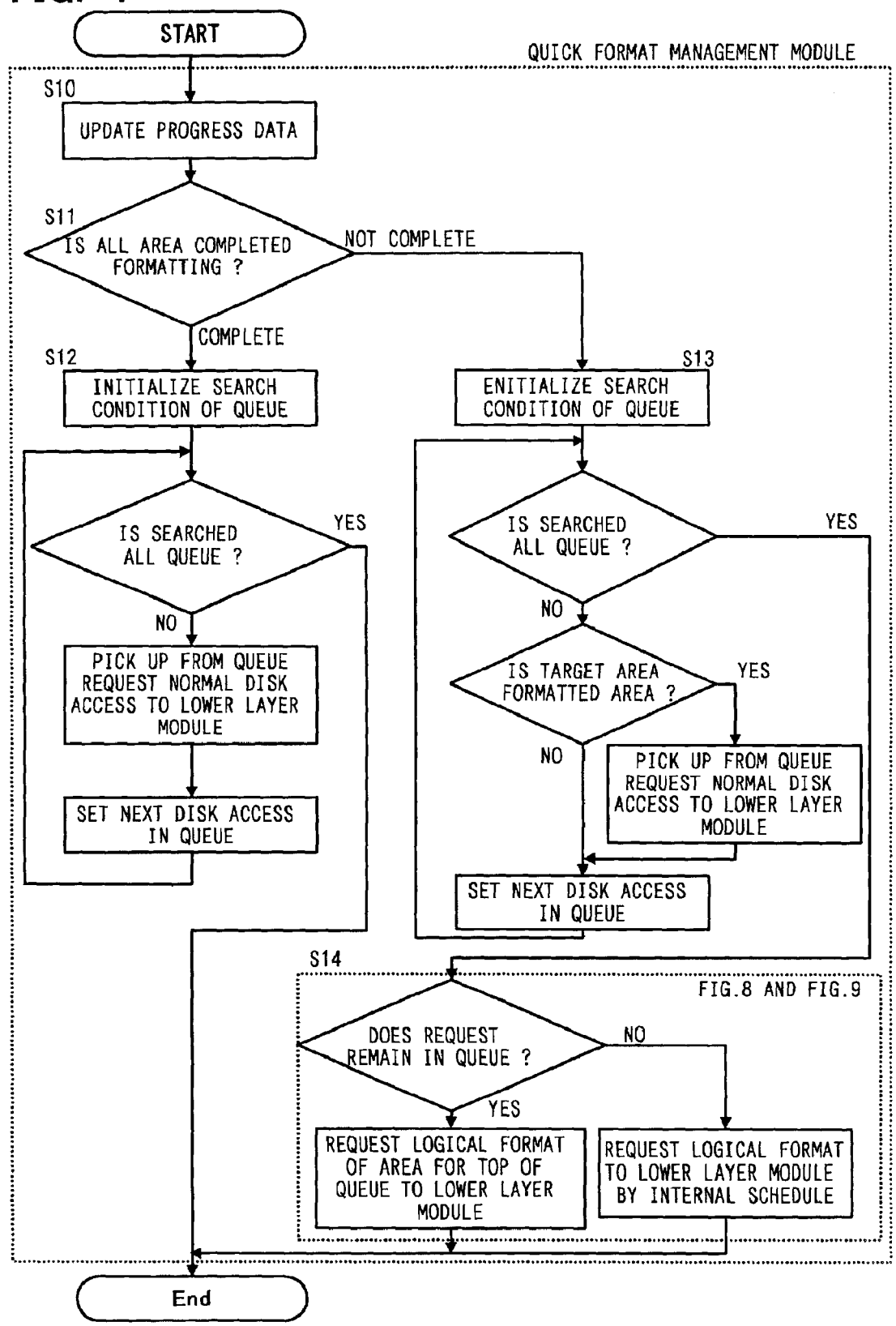
FIG. 7 is a flow chart depicting the processing in response to the format completion from the lower layer module of the quick format management module in FIG. 2.
Figure 8:
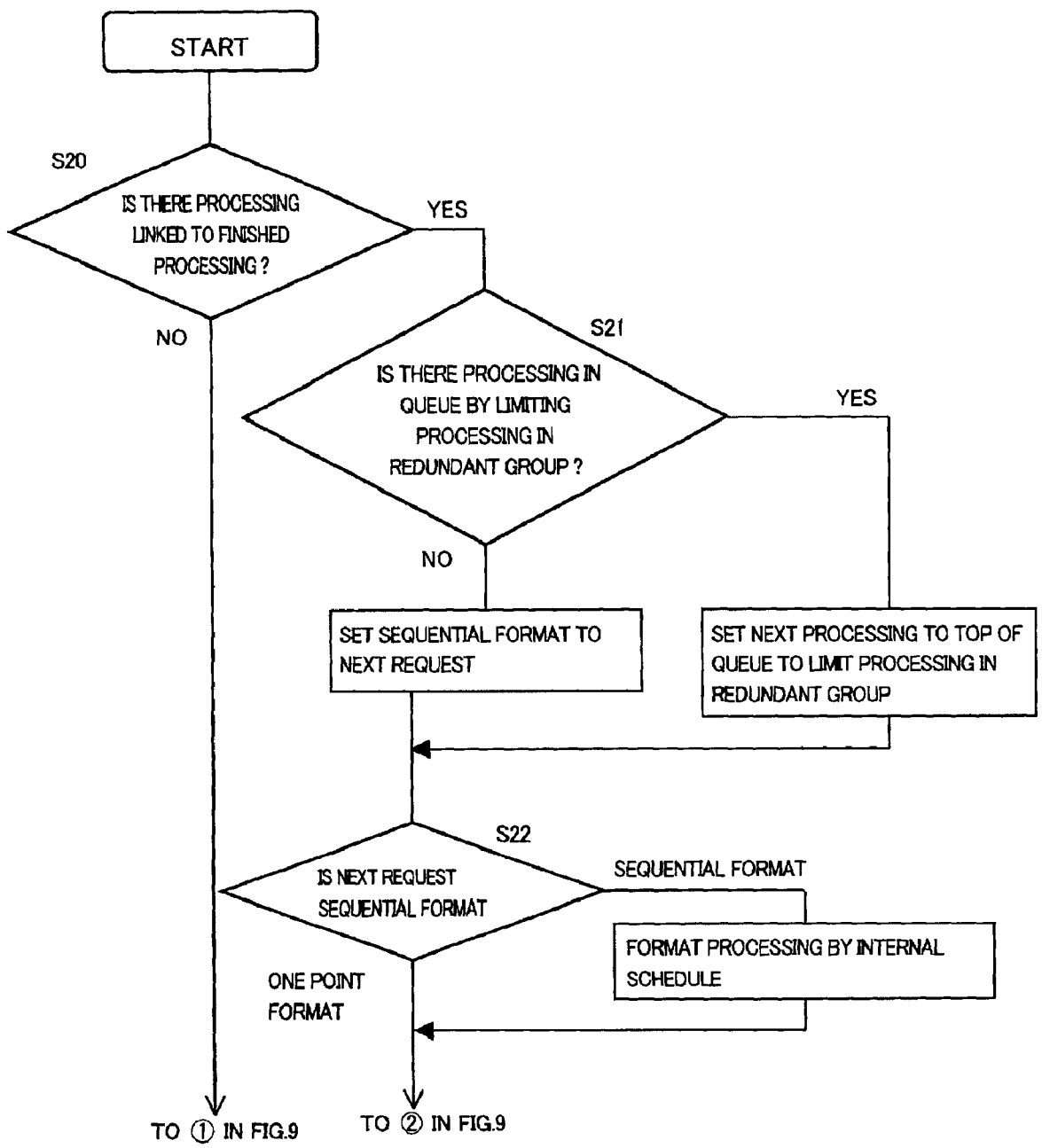
FIG. 8 is a flow chart depicting the format request processing (1) in FIG. 7.
Figure 9:
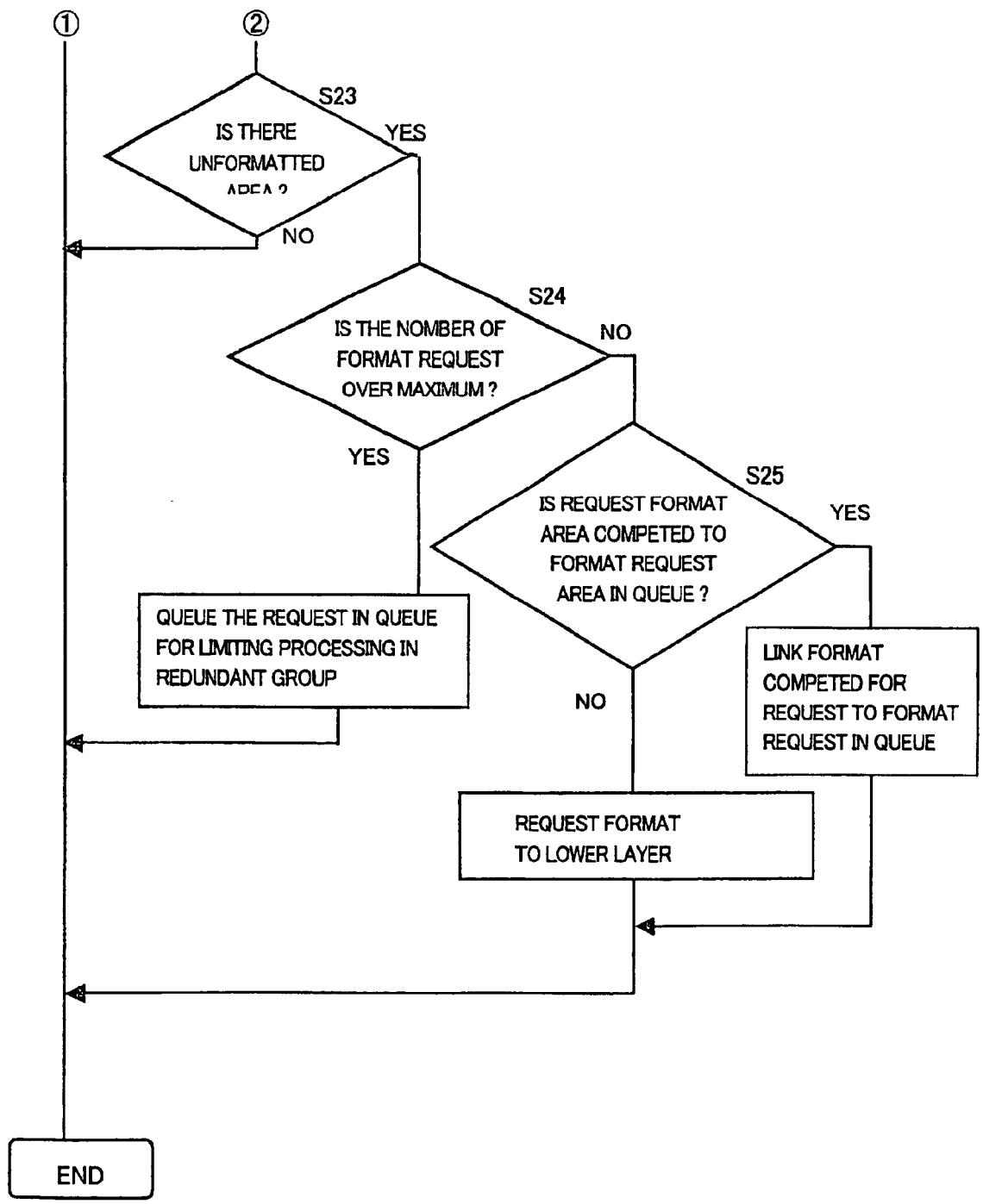
FIG. 9 is a flow chart depicting the format request processing (2) in FIG. 7.

Now processing when the quick format management module 21-1 to 21-4 receive a logical format completion from the lower layer module 22 will be described with reference to FIG. 7, FIG. 8 and FIG. 9.

(S10) When the logical format completion is received, progress information is updated first. In other words, the management table 33 and bit maps 34-0 to 34-n in FIG. 4 are updated according to the completed area.

(S11) It is judged whether all areas to be targeted under the quick format have been formatted referring to the management table 33 and bit maps 34-0 to 34-n.

(S12) When it is judged that all the areas have been formatted, after the search conditions of the format-waiting queue 31 are initialized, the format-waiting queue 31 is searched. And when a disk access on waiting access exists, the disk access is nicked off the queue 31 and normal access is requested to the lower layer module 22. This is repeated until a search of all the disk accesses in the queue 31 completes, and when the search of all the disk accesses completes, processing is ended.

(S13) When it is judged that all the areas have not been formatted, after the search conditions of the format queue 31 are initialized and the format-waiting queue 31 is searched for, and when a disk access on waiting exists, it is judged whether the access target area has been formatted referring to the bit maps 34-0 to 34-n. When formatted, the disk access is nicked up the queue 31, and a normal access is requested to the lower layer module 22. When not formatted, the disk access remains in the queue 31. This is repeated until a search of all the disk accesses of the queue 31 completes, and when the search of all the disk accesses completes, processing is ended.

(S14) Then logical format request processing is executed. In this processing, when an access request remains in the queue 31, as shown in FIG. 7, the logical format request for the access target area (called a "one-point format") is requested to the lower layer module 22. When no access request remains in the queue 31, on the other hand, the logical format of the area determined by the internal schedule (called "sequential format") is requested to the lower layer module 22. Details on this logical format request processing will be described later with reference to FIG. 8 and FIG. 9.

When there is no access in this manner, logical format processing is performed on each area of the logical volumes sequentially, and if there is access, it is judged whether the access target area has been formatted, and if not formatted, logical format processing is performed on the access target area. Then the formatted area is accessed.

As a result the wait time of host access can be decreased and logical format processing can be executed sequentially. Also in the logical format request processing in FIG. 8 and FIG. 9, these logical format requests are multiplexed.

(S20) The request content table R-M (see FIG. 5) of the request processing for which logical format completed is checked, and it is judged whether there is a format request accepted after linking the completed request processing. If there is no processing linked, this processing is ended, as shown in FIG. 9.

(S21) If there is a processing linked, it is checked whether the request processing exists in the queue 32 to limit the number of processing of a redundant group. If there is a queued processing, the next request processing is set at the beginning of the queue 32 to limit the number of processings of the redundant group. If there is no processing in the queue, sequential format processing is set for the next processing.

(S22) Then it is judged whether the next request is sequential format. If it is sequential format, the format area is decided based on the internal schedule. At this time, the format area can be decided referring to the above mentioned progress information of the bit maps 34-0 to 34-n.

(S23) It is decided whether an unformatted area exists in the logical format request target area. At this time, the format area can be decided referring to the above mentioned progress information of the bit maps 34-0 to 34-n. If there is no unformatted area, logical format is unnecessary, so processing ends without issuing this request to the lower layer module 22.

(S24) If there is an unformatted area in the logical format request target area, it is judged whether the number of format requests to a redundant group exceeds the maximum value. In other words, the quick format management module 21 counts the number of the format request that issues to the lower later module 22, and has not been processed by the lower layer module 22. Judgment is made referring to this count value. If it is judged that the number of format requests to a redundant group exceeds the maximum value, this format request processing is queued in the queue 32 to restrict the number of processings of the redundant group, and processing ends.

(S25) If the number of format requests for the redundant group does not exceed the maximum value, it is judged whether the target area of this format request competes with the area of format requests queued in the queue 35 of the lower layer module 22 referring to the above mentioned request content table R-M (see FIG. 5). If the area competes with the area of the format requests queued in the queue 35 of the lower layer module 22, priority is assigned in the competitive relationship column 106 of the request content table R-T of both these format requests in competition, and processing ends. If the area does not compete with the area of the format requests queued in the queue 35 of the lower layer module 22, a format request is issued to the lower layer module 22, and processing ends.

Figure 10:
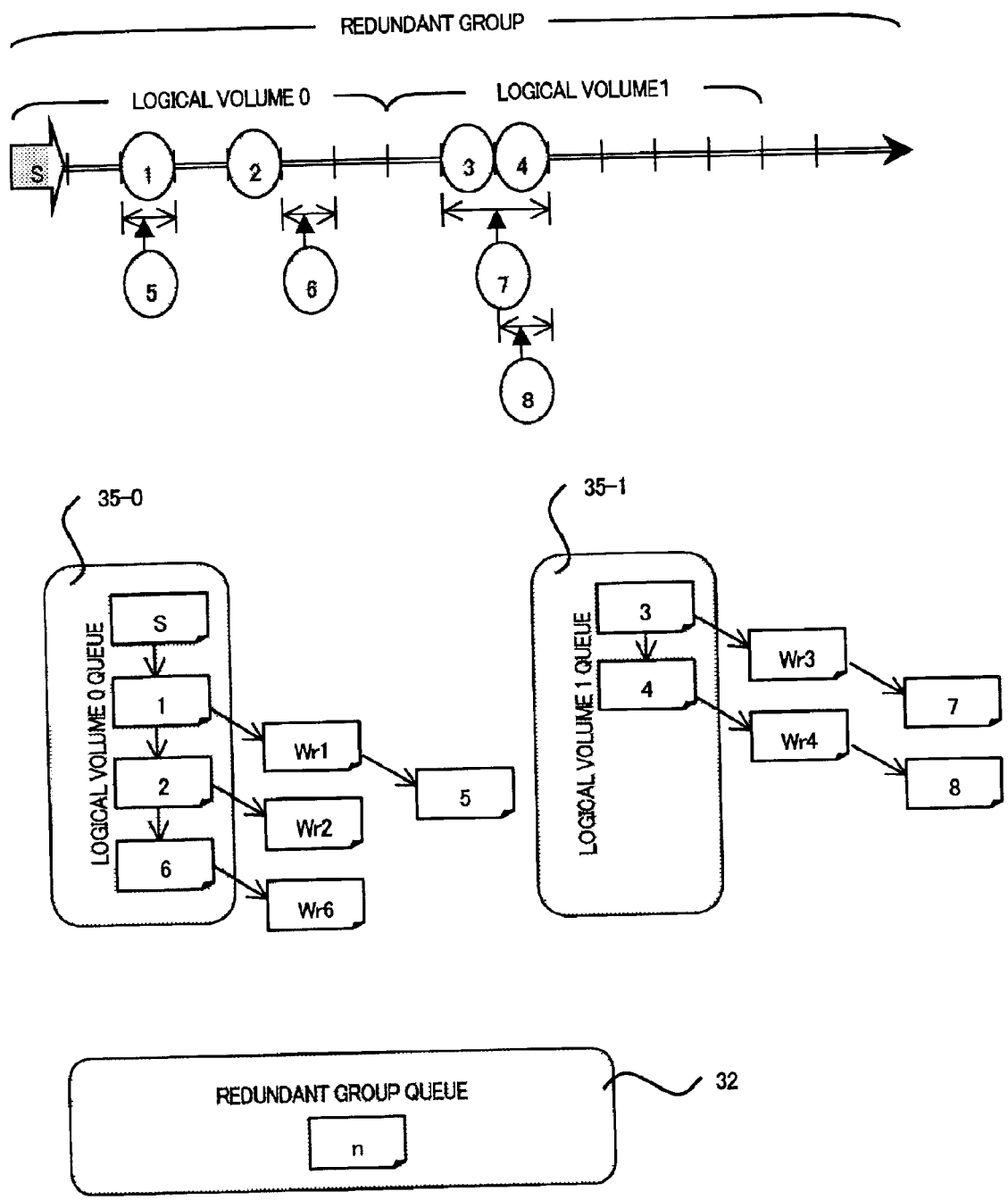
FIG. 10 is a diagram depicting the operation of format request processing (1) in FIG. 8 and FIG. 9.

FIG. 10 to FIG. 14 are diagrams depicting the operation of quick format processing. As FIG. 10 shows, an example when a disk access request is received from the upper layer module 20 during execution of sequential format 'S', and when one-point format requests '1' to '8' are sequentially issued will be described.

If the sequential format request to be executed next exists in the execution format queue (lower layer queue) 35-0 of the corresponding logical volume, one-point format requests '1', '2' and '6' are sequentially queued in the lower layer queue 35-0 of the logical volume '0'. While an one-point format request '5', which competes with the one-point format request '1', links with the one-point format request '1'.

In the same way, the one-point format requests '3' and '4' are sequentially queued in the lower layer queue 35-1 of the logical volume 1. The one-point format request '7', which competes with the one-point format requests '3' and '4', is linked with the one-point format request '3', since the one-point format request '7' has competes with the request '3' first.

The one-point format request '8' also competes with the one-point format request '7', but is linked with the one-point format request '4' since only competition in the format queues require attention during execution. If the number of format requests to the lower layer queues 35-0 and 35-1 exceed the maximum value, these format requests enter the queue 32 in the redundant group.

At this time the access requests (write requests) Wr1 to Wr8, to be the base of the one-point format requests '1', '2', '3', '4', '5', '6', '7', and '8', are queued in the format queue 31, and are linked, as shown in FIG. 10, based on the setting of the link information of the request content table R-T (see FIG. 5).

Figure 11:
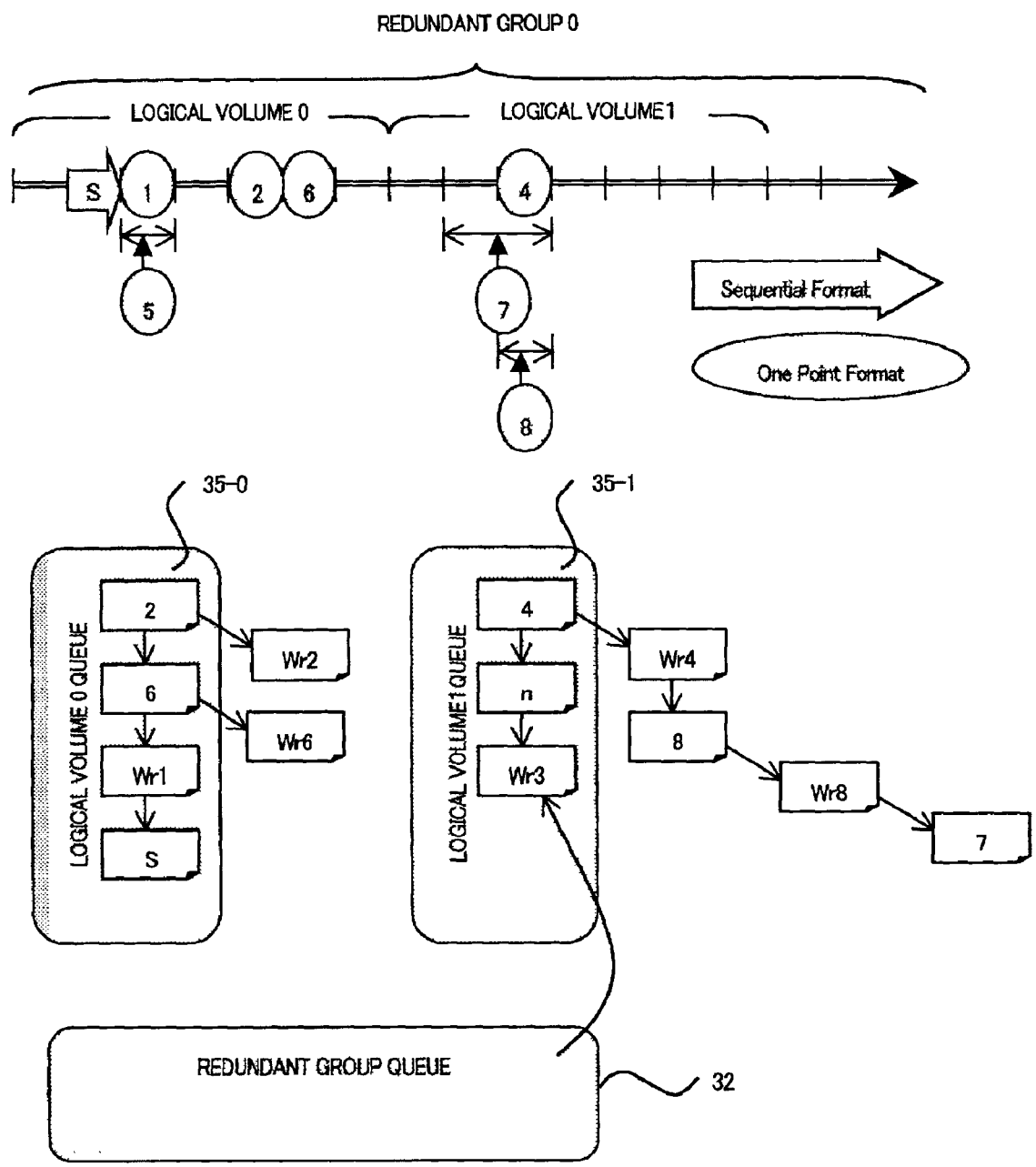
FIG. 11 is a diagram depicting the operation of format request processing (2) in FIG. 8 and FIG. 9.

When the execution of the sequential format 'S' and the one-point formats '1' and '3' are completed, as shown in FIG. 11, the executed sequential format request 'S' and the one-point format request '1' are bumped from the lower layer queue 35-0 of the logical volume '0'. Further, the one-point format request '2' becomes first, and the access request (write request) Wr1 of the format queue 31 is queued after the last request '6'. The one-point format request '5' is unlinked since the one-point format request '1' in competition is executed, and an access request is issued.

In the lower layer queue 35-1 of the logical volume '1', the one-point format request '4' becomes first, since the one-point format request '3' is executed, the request 'n' waiting in the redundant group queue 32 shifts to the lower layer queue 35-1, and the access request Wr3 of the format queue 31 is queued thereafter. The one-point format request '7' is now linked with the one-point format request '8', since the execution of the one-point format request '3' completed, but is in competition with the one-point format request '4'.

When the access request target area includes an unformatted area in this manner, a one-point format request is issued, this format request is queued in the format execution confirmation queue (lower layer queue), and format processing is requested to the lower layer. Therefore a plurality of format requests are requested to the lower layer.

Figure 12:
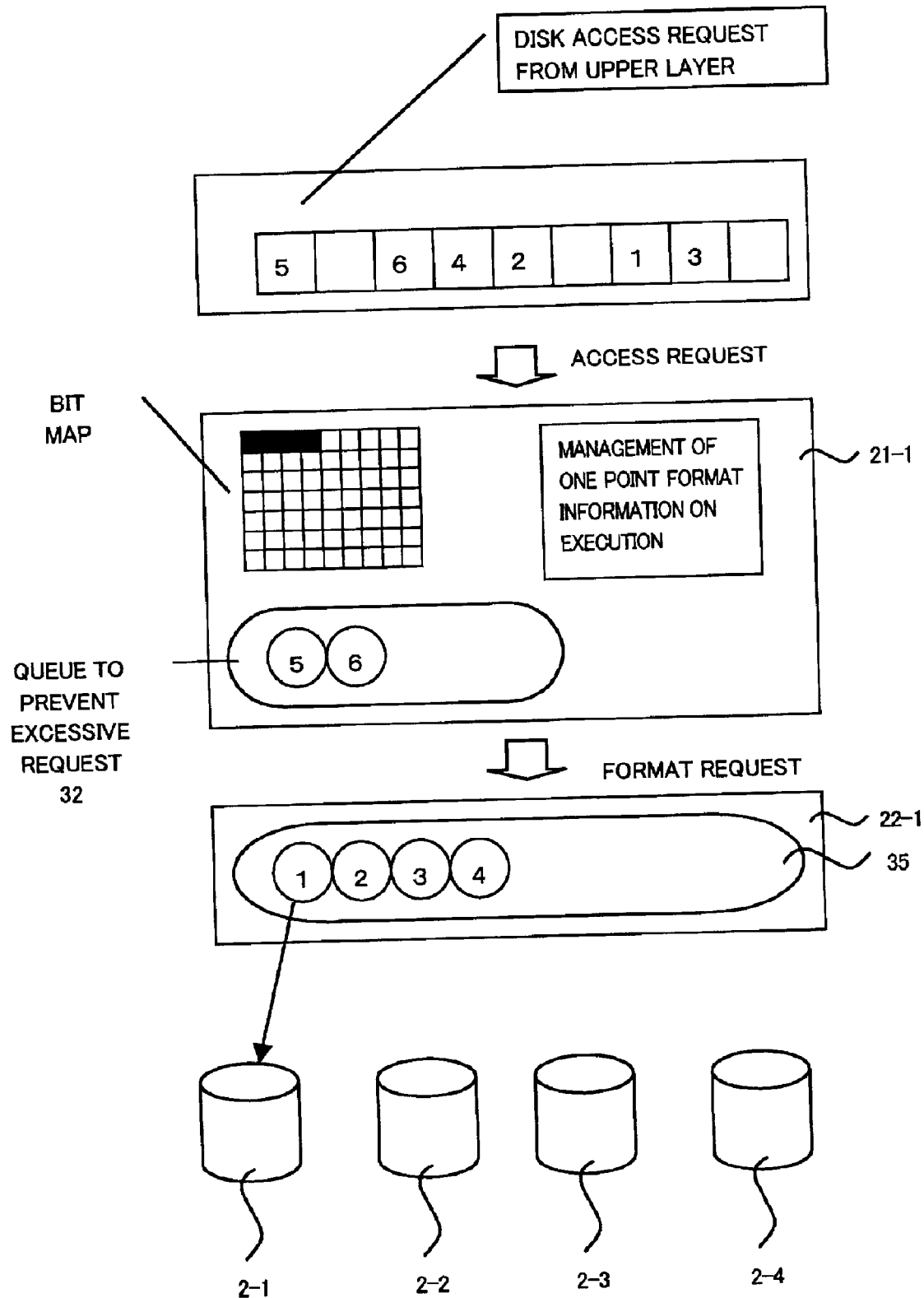
FIG. 12 is a diagram depicting the operation of format request processing (3) in FIG. 8 and FIG. 9.

The sequential format, on the other hand, is queued at the bottom end of the queue as format processing each time processing in a predetermined area (e.g. 1 block unit) ends. In the case of sequential format processing, an unformatted area is searched from the beginning of the bit map table 34, and the format request is executed, as shown in FIG. 12.

In this quick format, format areas may overlap since one-point format processing can be executed a plurality of times. In this case, the one-point format processing is linked with the first one-point format processing that the target area overlaps, and after the one-point format processing completes, the unformatted area of the target area is formatted.

If all the format areas of the one-point format, which are waiting since format areas overlap, have been formatted, format processing is not executed, and the link is cancelled.

When a one-point format request for a logical volume, where sequential format has not been executed, is received, the one-point format processing is also queued in the format execution confirmation queue, and then is requested to the lower layer where these plurality of request processings are simultaneously executed in parallel.

When the number of format processing requests is too many, the access requests are queued after the one-point format completes, as mentioned above, so the execution speed of access requests slows. To prevent this, the number of format processings for each redundant group and for each logical group are restricted, as shown in FIG. 12, and this restriction temporarily holds the format processing.

Figure 13:
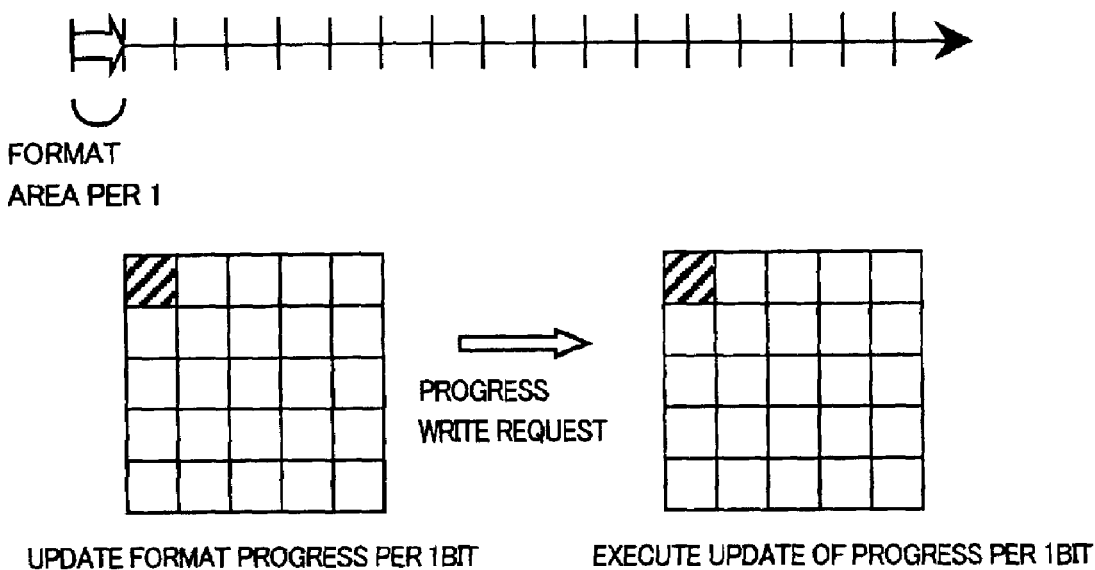
FIG. 13 is a diagram depicting the update operation of bit maps in FIG. 4.

Also, as FIG. 13 shows, the progress of unformatted/ formatted information for several blocks per bit is managed using bit maps 34-0 to 34-n, and the progress information is updated each time 1 bit of format processing completes in this progress management. By this, it is possible to manage more detailed progress information.

When one-point format processings due to the host access during execution of quick format and sequential format processing are in competition, the return from the sequential format during execution becomes faster, and the response delay to host access can be controlled. Also processing is fast since only 1 bit of bit maps is confirmed during the execution of format processing.

In the above mentioned progress information update method, progress information in format processing units is also updated. In this update method, the progress information is updated at the completion of format processing, so it is unnecessary to execute an update a plurality of times during one-point format, an update is executed only once after completion of format, so as a result the response to host access becomes faster.

Figure 14:
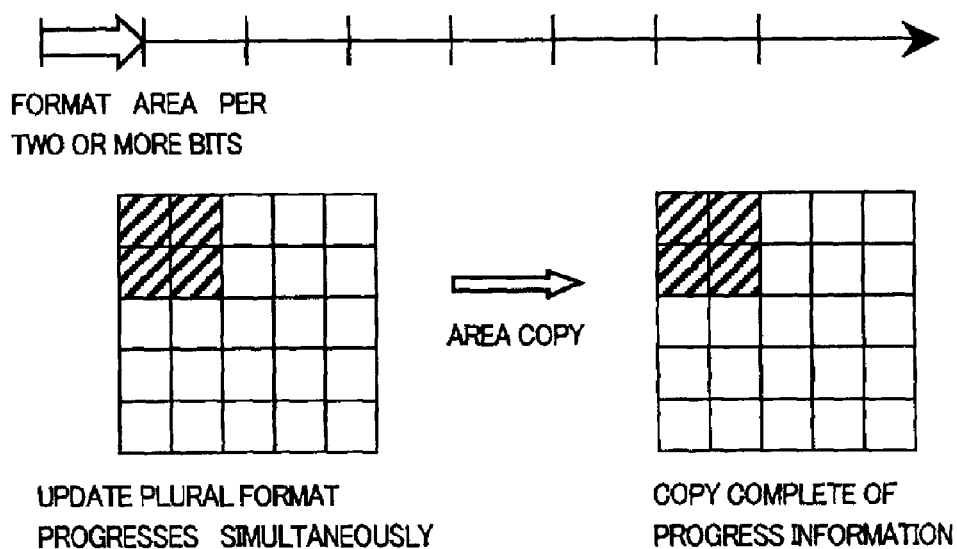
FIG. 14 is a diagram depicting another update operation of bit maps in FIG. 4.

Also when progress information is updated in format processing units, the progress information can be efficiently updated by copying the table. As FIG. 14 shows, a plurality of bits can be updated all at once every time a plurality of format processings complete.

Figure 15:
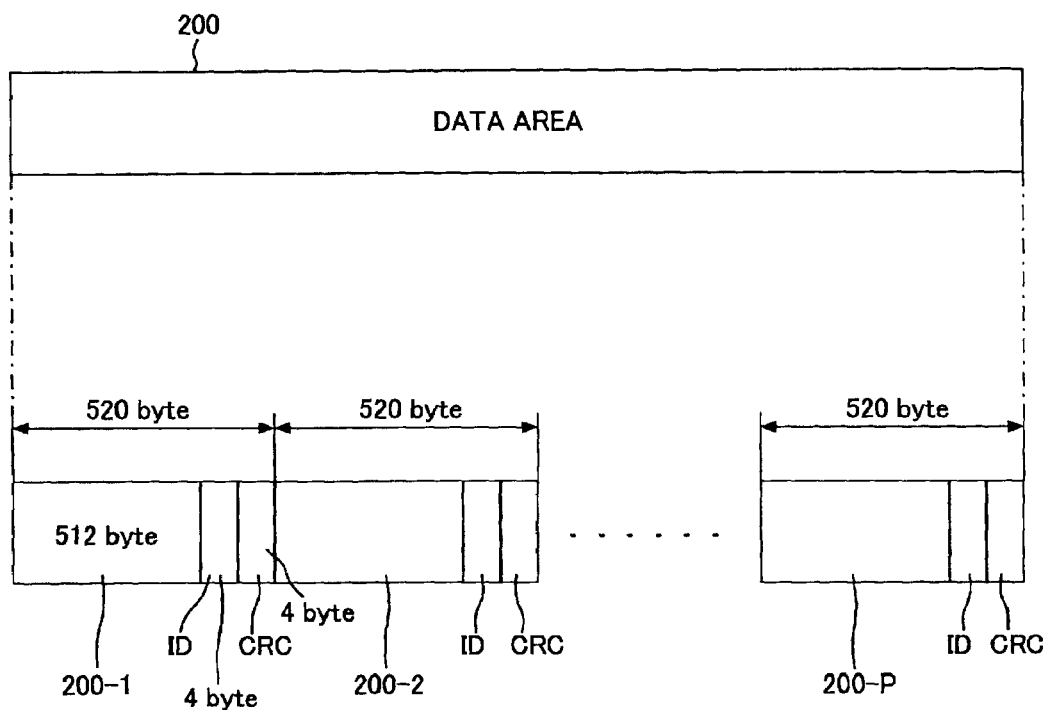
FIG. 15 is a diagram depicting the logical format in FIG. 2.
Figure 16:
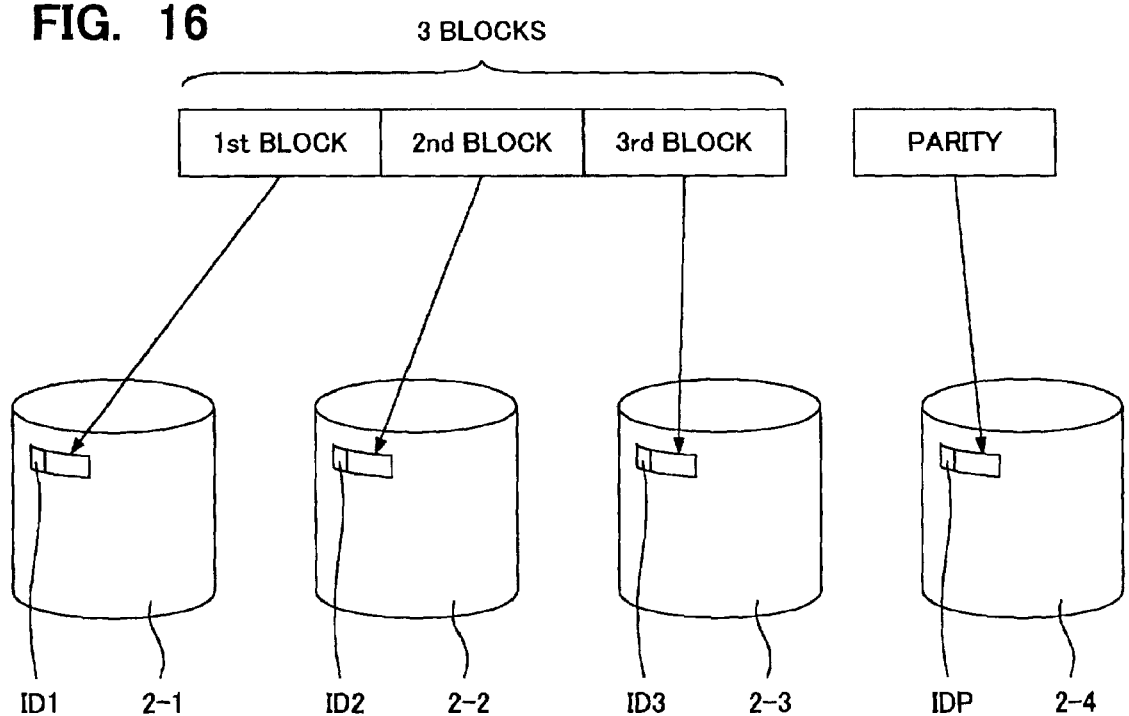
FIG. 16 is a diagram depicting the logical format in RAID 5 in FIG. 2.
Figure 17:
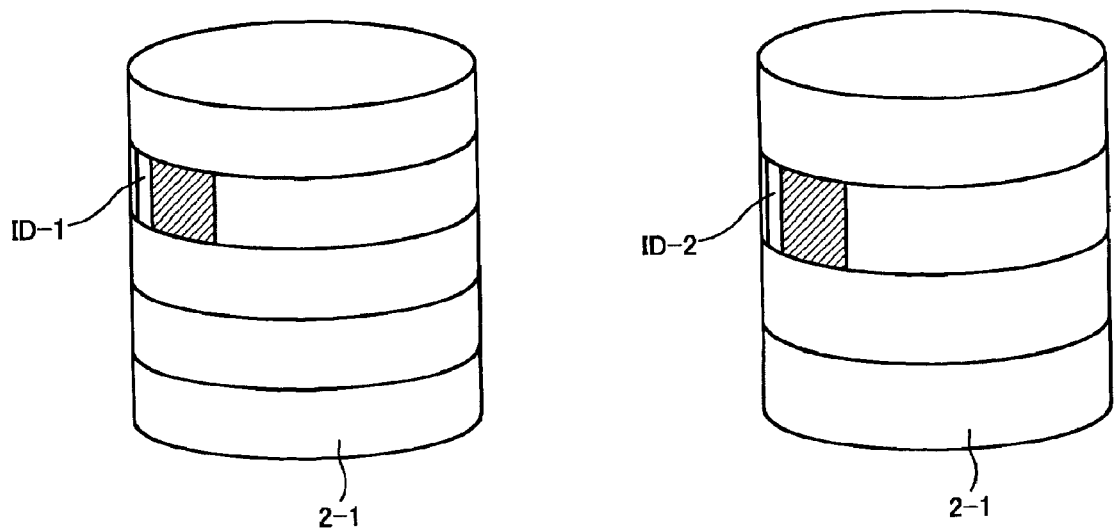
FIG. 17 is a diagram depicting the logical format in RAID 1 in FIG. 2.

FIG. 15 to FIG. 17 are diagrams depicting logical formats. Logical format entails logically formatting the physical disk 2 so that data access to the physical disk of the host becomes possible. And this formatting basically divides one track of the data area 200 into processing units (e.g. a 512 byte block) of the host, and writes an ID (Identifier) and such a check code as CRC in each block 200-1 to 200-p.

In RAID 5 shown in FIG. 16, 1 block of 3 block data is assigned to physical disks 2-1, 2-2 and 2-3 respectively, and the parity data thereof is assigned to the physical disk 2-4. At this time in logical format processing, a link number is assigned to an ID so as to associate these blocks. For example, ID1, ID2, ID3 and IDP are assigned to the block IDs corresponding to the physical disks 2-1, 2-2, 2-3 and 2-4.

In the same way, as FIG. 17 shows, the same ID number is assigned to the redundant data blocks during the mirroring of RAID 1. For example, ID1 is assigned to the redundant data blocks of the physical disks 2-1 and 2-2, which are used for mirroring.

As a result, progress information on whether each block on the logical volume has been formatted or not is managed by bit maps 34, so if disk access is requested, it can be judged whether all of this access area has been formatted. If formatted, a disk access is requested to the lower layer module, and if not formatted, a logical format processing request is issued before the disk access, and the disk access request is queued in the queue.

If there are no disk access requests in the queue, on the other hand, the unformatted area is searched in the bit maps 34, and a logical format processing request is issued. Also at the completion of the execution of the logical format processing request, the bit maps 34 for managing the progress information are updated.

Therefore a disk access request can be executed while executing the sequential format processing, and it can easily be judged whether the target access area of the disk access request has been formatted or not, so that the response speed to the access request can be increased even if quick format is executed. Return to the sequential format is also easy, since bit maps are referred to.

Also, competition among the plurality of logical format requests of host accesses for an unformatted area and competition between a logical format request of a host access and sequential format request are judged, and one is held, for which link processing is executed, so even if logical format requests are continuously issued, these logical format requests can be organized and processed. This makes the response to host access faster.

Even if logical format requests are continuously issued, the number of queues in the lower layer is limited, and format processing requests when the limit is exceeded are temporarily held in redundant group or logical volume units, and a delay in format processing in redundant group and logical volume units can be prevented.

Also, whether a logical volume is formatted or not can be managed by the management table 33 and bit maps 34 in logical volume units and block units, and format processing in logical format units is possible. This means that bit maps 34 are not searched for a formatted logical volume, therefore a delay of processing can be prevented. Since progress information is managed by bit maps 34, reference processing and update processing can be faster, and as a result, disk access requests can be faster.

[Redundant Configuration of Quick Format Processing]

Figure 18:
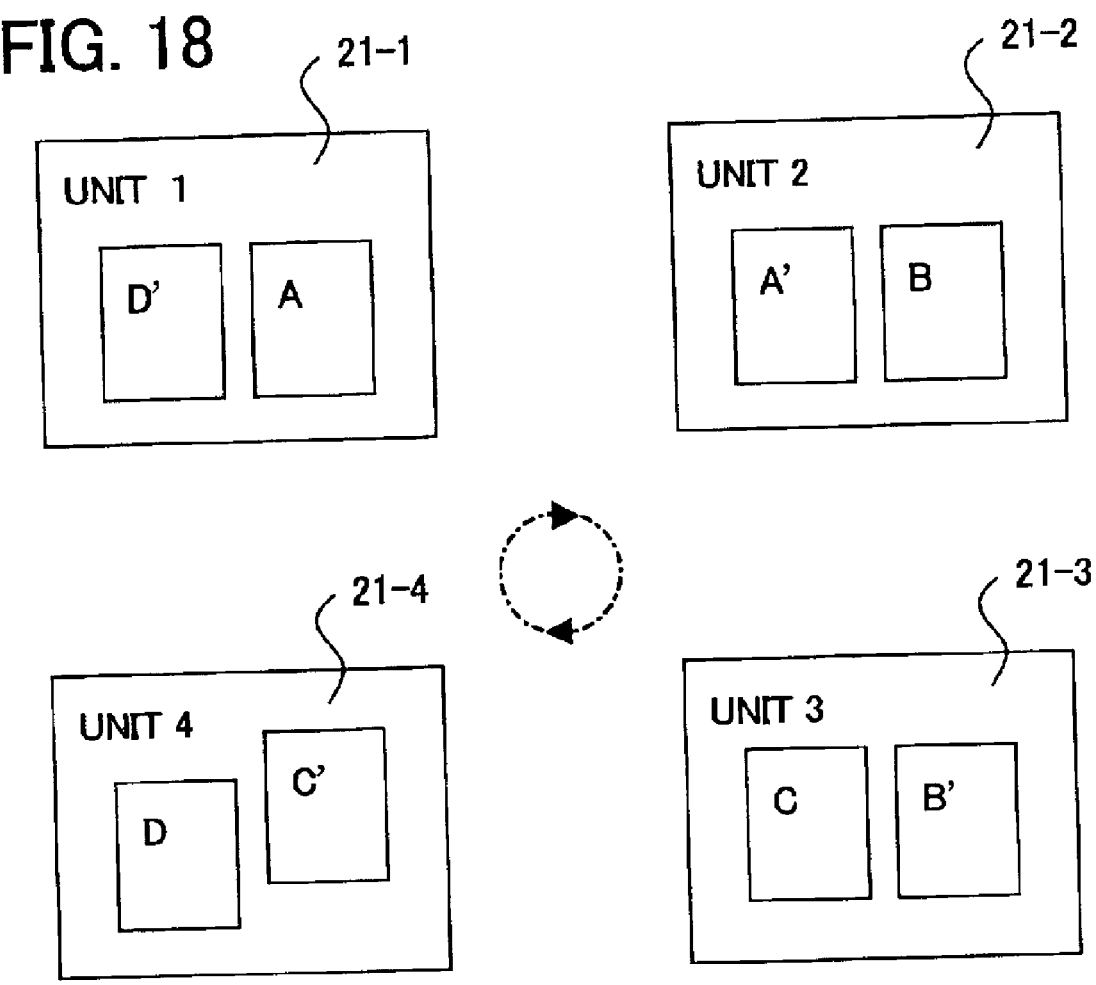
FIG. 18 is a diagram depicting a redundant configuration of a quick format progress management table in a redundant group in an embodiment of the present invention.
Figure 19:
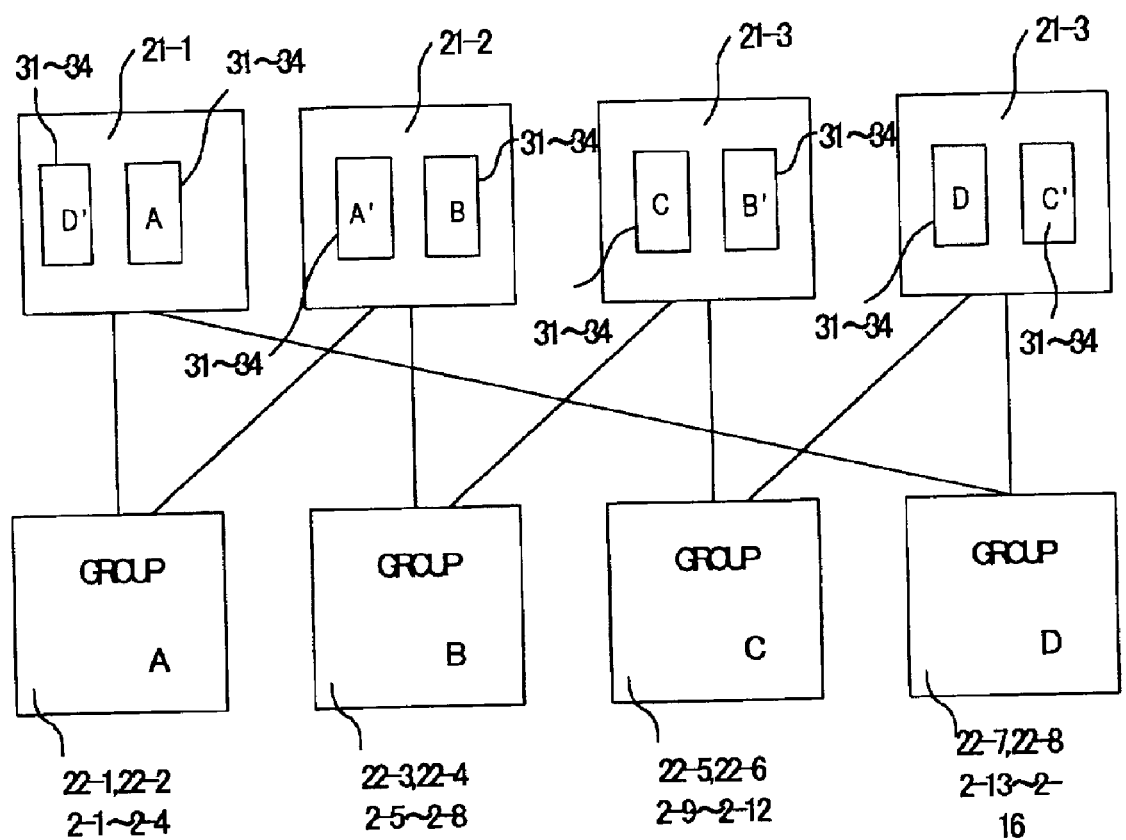
FIG. 19 is a diagram depicting the redundant configuration of the quick format in the redundant group of an embodiment of the present invention in FIG. 18.
Figure 20:
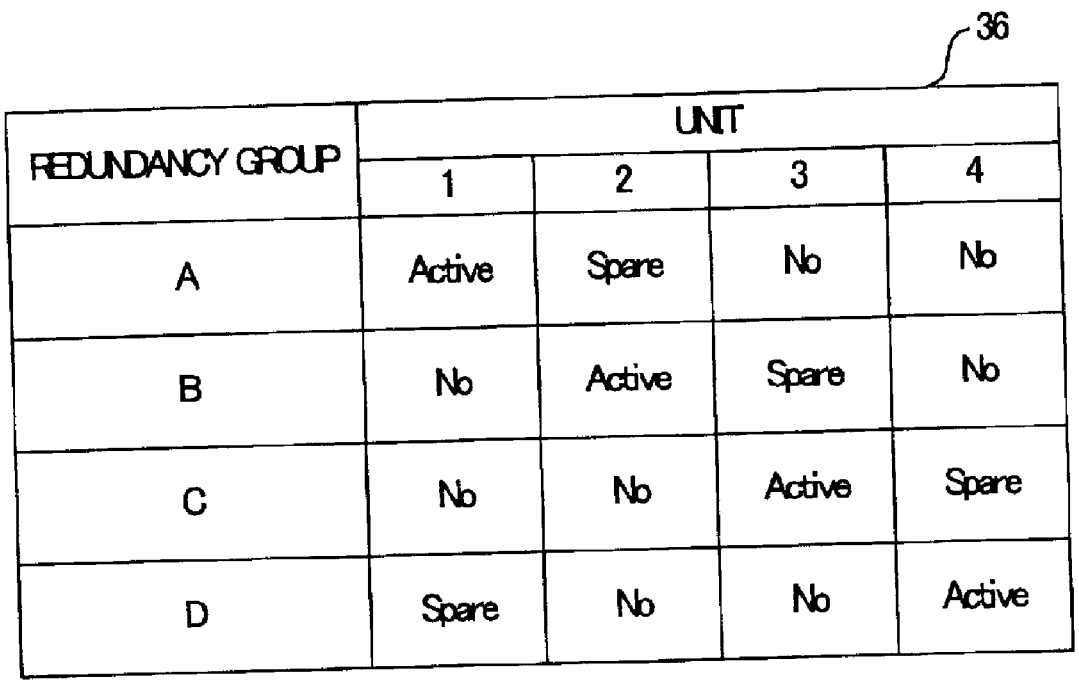
FIG. 20 is a diagram depicting a configuration table for a redundant configuration of a quick format progress management table in a redundant group of an embodiment of the present invention in FIG. 18.

The redundant configuration of quick format processing in a redundant group configuration will now be described. FIG. 18, FIG. 19 and FIG. 20 are diagrams depicting redundant configurations of quick format processing in redundant group configurations.

In the configuration in FIG. 2, four quick format management modules 21-1-21-4 are set for the four redundant groups A, B, C and D. Each management module 21-1-21-4 is in-charge of two redundant groups. In other words, as the logical connection diagram shows in FIG. 19, the management module 21-1 is in-charge of the redundant group A, and is also in-charge of redundant group D when a failure occurs. The management modules 21-2, 21-3 and 21-4 are in-charge of redundant groups B, C and D respectively, and are also in-charge of redundant groups A, B and C when a failure occurs. The connection relationship in FIG. 19 is shown by logical paths. The RAID configuration table 36 of the RAID management module 23 is set as shown in FIG. 20, and is used for dual-controll.

In this case, as FIG. 18 and FIG. 19 show, copy D' of the progress information table of the redundant group D (at least management table 33 and bit map 34, and two queues 31 and 32 are included in this example) is set in the management module 21-1, in addition to the progress table A (two queues, 31 and 32, management table 33 and bit map 34) of redundant group A.

In the same way, progress information table A', B' and C' of redundant groups A, B and C, which are in-charge when a failure occurs, are set in management modules 21-2, 21-3 and 21-4, in addition to the progress information tables B, C and D of redundant groups B, C and D respectively.

In other words, a plurality of units 1 to 4 (21-1 to 21-4), having quick format management modules respectively, have respective progress information so as to make progress information redundant. That is, as FIG. 18 and FIG. 20 show, each unit having progress information is paired cyclically to be duplicated. Accordingly, the progress information of the logical format is also duplicated.

As a result, even if one of duplicated progress information is lost or even if one unit having progress information loses progress information, including the bit map table on hardware due to a hardware failure, the progress information can be restored from or by the other unit so as to continue quick format.

Figure 22:
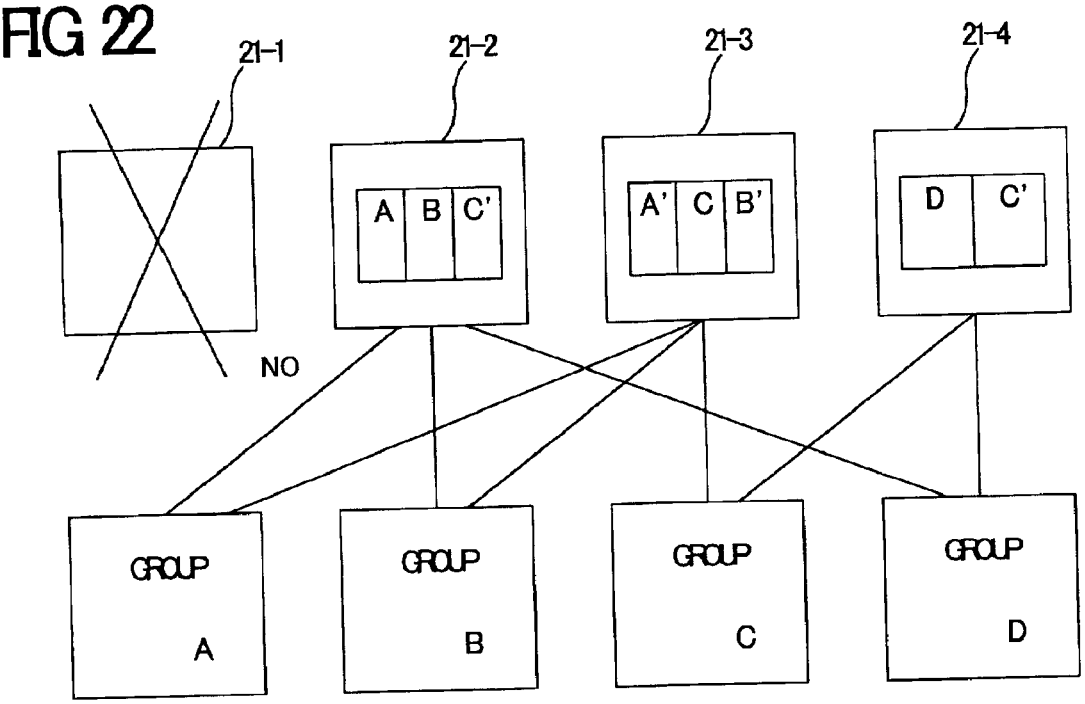
FIG. 22 is a diagram depicting the rebuild redundant configuration of the quick format in the redundant group according to an embodiment of the present invention in FIG. 21.

FIG. 21, FIG. 22, FIG. 23 and FIG. 24 are diagrams depicting the redundant control of quick format processing in the redundant group configuration in FIG. 2. In the redundant configuration in FIG. 18, if one unit having progress information loses the progress information, including the bit map table on hardware due to a hardware failure, causing redundancy loss, the bit maps and progress information can be restored from another unit if a spare unit for redundancy has been installed, as shown in FIG. 21 and FIG. 22, so as to maintain the redundant configuration.

As shown in FIG. 21 and FIG. 22, it is assumed that one unit 1 having progress information (quick format management module 21-1) has lost progress information, including the bit map table on hardware due to a hardware failure, thus losing redundancy.

In this case, as FIG. 21 and FIG. 22 show, there are other units 2, 3 and 4, which can form redundancy (quick format management modules 21-1, 21-3, 21-4), so the bit maps and progress information are restored again from the progress information of the remaining units, 2, 3 and 4, and the progress information table D' and A' of the redundant groups A and D of unit 1 are added to the spare units 2 and 3. By this, the redundant configuration of the progress information table can be formed.

Figure 24:
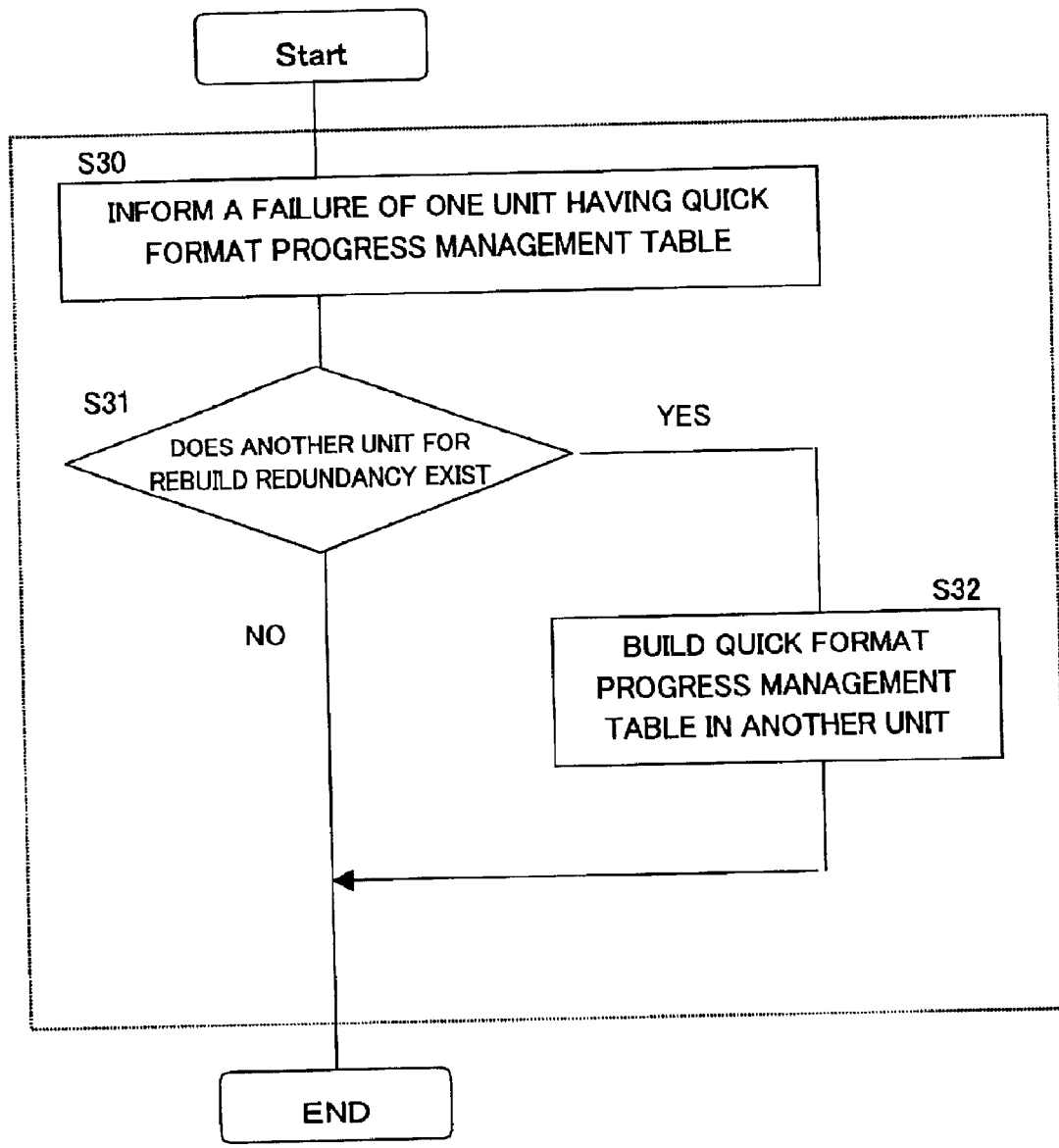
FIG. 24 is a diagram depicting the configuration table by processing in FIG. 23.

This redundant control is performed by the RAID management module 23. FIG. 24 is a flow chart depicting the redundant control to be executed by the RAID management module 23 when the unit fails.

(S30) The RAID management module 23 receives a failure notice from a unit having quick format progress information (quick format management module 21-1 in the cases of FIG. 21 and FIG. 22).

(S31) The RAID management module 23 judges whether there is another unit (quick format management module) which can form redundancy again, referring to the configuration table 36 in FIG. 20. If there is no unit to form redundancy again, processing is terminated.

(S32) If there is another unit which can form redundancy again, the quick format progress management table of unit 1 is constructed in the units 2 and 3, as shown in FIG. 21 and FIG. 22, according to the rule of clockwise cyclic pairs in FIG. 18, using the configuration table 36 in FIG. 20. Processing is then completed. As a result, the configuration table 36 becomes as shown in FIG. 23.

In the same manner, the failed unit 1 is replaced with a normal unit, and the initial redundant configuration can be restored again in the normal state. In other words, if the unit 1 is replaced with a normal unit in the state in FIG. 21, the state is automatically returned to the redundant configuration in FIG. 18 according to processing which is the opposite of the processing in FIG. 24.

In the above embodiment, a RAID with the redundant configuration shown in FIG. 2 was described, but the present invention can be applied to a storage system with other redundant configurations. For the physical disk, a magnetic disk, optical disk, magneto-optical disk or various storage devices can be applied.

In the present invention, host access can be executed while executing logical format sequentially, since the logical format processing of the physical disk is executed in the background of host access.

Since progress information, as to whether each block on the logical volume has been formatted or not, is managed by a table, a disk access request can be executed while executing sequential format processing, and whether an access area for which disk access is requested has been formatted or not can be easily judged, the response speed to an access request can be increased even if quick format is executed.

Also progress information of quick format is managed with redundancy when redundant groups are configured, so quick format processing can be made redundant, and when one unit fails, quick format processing can be continued by another unit using the progress information thus far.

What is claimed is:

1. A RAID controller, which accesses an access request area on logical volumes distributed and stored on a plurality of physical disks according to a disk access request from a host device, comprising:

a plurality of physical disk groups storing different logical volumes, wherein one logical volume is distributed to a plurality of physical disks to form a plurality of redundant groups;

a plurality of management modules managing said plurality of redundant groups-included on said plurality of physical disks, and issuing a logical format processing request for logical formatting of each said disk access request area of each of said logical volume distributed to said plurality of physical disks forming said redundant groups, by referring to one of a plurality of management tables for managing progress information of said logical format of each of said logical volume distributed to said plurality of physical disks forming said redundant groups; and a plurality of lower layer modules for accessing one of said plurality of physical disks according to the processing of said logical format processing request of said plurality of management modules, wherein each said management module comprising:

one of said plurality of said management tables managing said plurality of redundant groups; and a queue queuing said disk access request, and wherein each of said plurality of management modules, according to said disk access request, judges whether each of said access request area has been logically formatted referring to one of said plurality of management tables, and when judged as formatted, requests each of said disk access requests to said plurality of lower layer modules, and when not formatted, issues a logical format processing request and queues said disk access request in said queue, and wherein when no disk access request exists in said queue, searches an unformatted area from one of said plurality of management tables, and issues a logical format processing request to said plurality of lower layer modules.

2. The RAID controller according to claim 1, wherein, when one of said plurality of management modules has an abnormality, another one of said plurality of management modules executes said logical format processing for each said disk access request area of each of said logical volume, distributed to said plurality of physical disks forming said redundant groups managed by one of said plurality of management modules.

3. The RAID controller according to claim 1, further comprising a RAID management module for restoring said management table of one of said plurality of physical disk groups which one of said plurality of management modules manages in a management module of said plurality of management modules other than said management module issuing said logical format processing request using a management table of another of said plurality of management modules when the one of said plurality of management modules has an abnormality.

4. The RAID controller according to claim 3, wherein said RAID management module executes said restoration referring to a configuration table where a RAID configuration is stored.

5. The RAID controller according to claim 1, wherein one of said plurality of management tables manages the progress status of said logical volume in logical format processing units by bit maps.

6. The RAID controller according to claim 5, wherein one of said plurality of management modules, updates said one of plurality of management tables for managing said progress information at the completion of said logical format processing request, searches said queue at the completion said logical format processing request, and issues said disk access request, for which said logical format processing request has completed.

7. A RAID control method for accessing an access request area of a plurality of physical disk groups including different logical volumes, where one logical volume of said different logical volumes is distributed to plurality of physical disks to form redundant groups, according to a disk access request from a host device, comprising:

issuing a logical format processing request for the logical format of each area of said one logical volume referring to a management table for managing the progress information of the logical format processing of said one logical volume;

judging whether all of said access request areas have been logically formatted by referring to said management table according to said disk access request;

requesting said disk access request to a lower layer module which accesses said physical disk when judged as formatted;

issuing said logical format processing request and queuing said disk access request to a queue when not formatted; and updating said management table having redundancy according to a completion notice of the processing of said logical format from said lower layer module.

8. The RAID control method according to claim 7, further comprising executing a said logical format of said physical disks, wherein a first logical format management module manages a second logical format management module when said first logical format management module has an abnormality.

9. The RAID control method according to claim 7, further comprising restoring the management table of said one logical volume, wherein a first logical format management module includes the management table, and said first logical format management module manages a second logical format management module using said management table of said first logical format management module when said second logical format management module has an abnormality.

10. The RAID control method according to claim 9, wherein said restoring comprises executing said restoring by referring to a configuration table where a RAID configuration is described.

11. The RAID control method according to claim 7, wherein said management table manages the progress status of said logical volume in logical format processing units by bit maps.

12. The RAID control method according to claim 7, further comprising:

searching said queue at the completion of execution of said logical format processing request; and issuing said disk access request for which said logical format corresponding to said logical format processing request has completed to said lower layer module.

* * * * *

UNITED STATES PATENT AND TRADEMARK OFFICE
CERTIFICATE OF CORRECTION

PATENT NO.    : 6,851,022 B2
DATED         : February 1, 2005
INVENTOR(S)   : Kazuhiko Ikeuchi et al.

It is certified that error appears in the above-identified patent and that said Letters Patent is hereby corrected as shown below:

Column 14,
Line 16, insert -- a -- after "to".

Signed and Sealed this

Twenty-third Day of August, 2005

JON W. DUDAS
*Director of the United States Patent and Trademark Office*